(12) United States Patent
Wilkinson

(10) Patent No.: US 11,306,454 B2
(45) Date of Patent: Apr. 19, 2022

(54) EROSION CONTROL APPARATUS

(71) Applicant: WILKINSON ECOLOGICAL DESIGN, Orleans, MA (US)

(72) Inventor: Seth Wilkinson, Orleans, MA (US)

(73) Assignee: WILKINSON ECOLOGICAL DESIGN, Orleans, MA (US)

( * ) Notice: Subject to any disclaimer, the term of this patent is extended or adjusted under 35 U.S.C. 154(b) by 0 days.

(21) Appl. No.: 15/908,497

(22) Filed: Feb. 28, 2018

(65) Prior Publication Data

US 2018/0238006 A1 Aug. 23, 2018

Related U.S. Application Data

(63) Continuation-in-part of application No. PCT/US2017/049717, filed on Aug. 31, 2017, which is a continuation-in-part of application No. 15/253,464, filed on Aug. 31, 2016, now Pat. No. 10,125,462.

(51) Int. Cl.
| | |
|---|---|
| *E02B 3/12* | (2006.01) |
| *E02D 17/20* | (2006.01) |
| *E02D 5/80* | (2006.01) |
| *E02B 3/04* | (2006.01) |

(52) U.S. Cl.
CPC .............. *E02B 3/126* (2013.01); *E02B 3/04* (2013.01); *E02B 3/123* (2013.01); *E02B 3/125* (2013.01); *E02D 5/80* (2013.01); *E02D 17/20* (2013.01); *E02D 17/202* (2013.01); *E02D 2300/0026* (2013.01); *E02D 2600/30* (2013.01)

(58) Field of Classification Search
CPC ......... E02B 3/125; E02B 3/126; E02D 17/20; E02D 17/202; E02D 17/205

USPC ................................................... 405/262
See application file for complete search history.

(56) References Cited

U.S. PATENT DOCUMENTS

| | | | |
|---|---|---|---|
| 4,725,168 A * | 2/1988 | Fagundes | E02D 5/74 248/289.11 |
| 5,338,131 A | 8/1994 | Bestmann | |
| 5,509,755 A | 4/1996 | Olsen et al. | |
| 5,641,244 A | 6/1997 | Bestmann | |
| 5,658,096 A | 8/1997 | Von Kanel | |
| 5,678,954 A | 10/1997 | Bestmann | |
| 5,786,281 A | 7/1998 | Prunty et al. | |

(Continued)

FOREIGN PATENT DOCUMENTS

| | | |
|---|---|---|
| JP | 2000-120070 A | 4/2000 |
| KR | 20-0382114 Y1 | 4/2005 |

(Continued)

OTHER PUBLICATIONS

International Search Report and Written Opinion for Application No. PCT/US2017/049717, dated Nov. 24, 2017, 18 pages.

(Continued)

*Primary Examiner* — Frederick L Lagman
(74) *Attorney, Agent, or Firm* — McCarter & English, LLP

(57) ABSTRACT

The present invention relates to an erosion control apparatus and methods of using and installing the apparatus. The apparatus is constructed to prevent erosion of soil during typical weather or tidal conditions and adverse weather events. The apparatus can include a plurality of anchored rolls and soil lifts operative to stabilize the shoreline.

28 Claims, 26 Drawing Sheets

(56) References Cited

U.S. PATENT DOCUMENTS

| | | | |
|---|---|---|---|
| 5,951,202 A * | 9/1999 | Brown | E02B 3/04 405/19 |
| 6,527,477 B1 | 3/2003 | Allard | |
| 6,641,335 B1 | 11/2003 | Allard | |
| 6,893,193 B2 | 5/2005 | Santha | |
| 7,029,208 B1 | 4/2006 | Santha | |
| 7,384,217 B1 | 6/2008 | Barrett et al. | |
| 7,422,682 B2 | 9/2008 | McPhillips | |
| 7,425,107 B2 | 9/2008 | Derache | |
| 7,674,071 B2 | 3/2010 | Shaw et al. | |
| 7,789,594 B2 | 9/2010 | Stahm | |
| 8,740,503 B1 | 6/2014 | Tyler | |
| 8,864,424 B2 | 10/2014 | Jones et al. | |
| 9,315,962 B2 | 4/2016 | Santha | |
| 9,493,923 B1 | 11/2016 | Miller | |
| 10,125,462 B2 | 11/2018 | Wilkinson | |
| 2002/0131826 A1 | 9/2002 | Spangler et al. | |
| 2003/0022134 A1 | 1/2003 | Seniuk | |
| 2003/0143026 A1 | 7/2003 | Santha | |
| 2004/0005198 A1 | 1/2004 | Spangler et al. | |
| 2004/0228692 A1 | 11/2004 | McCamy | |
| 2005/0161407 A1 | 7/2005 | McPhillips | |
| 2005/0169709 A1 | 8/2005 | Toups et al. | |
| 2005/0254899 A1 | 11/2005 | Tyler | |
| 2006/0032804 A1 | 2/2006 | McPhillips | |
| 2007/0003369 A1 | 1/2007 | Hanson et al. | |
| 2007/0253785 A1 | 11/2007 | Tyler | |
| 2007/0269275 A1 | 11/2007 | Kimberlin | |
| 2009/0071596 A1 | 3/2009 | Theisen et al. | |
| 2011/0206458 A1 | 8/2011 | Jones et al. | |
| 2012/0020745 A1 | 1/2012 | Miller et al. | |
| 2012/0243949 A1 | 9/2012 | Schneider et al. | |
| 2012/0257933 A1 | 10/2012 | De Giuseppe et al. | |
| 2014/0270960 A1 | 9/2014 | Breitenbeck | |
| 2015/0098762 A1 * | 4/2015 | Melby, III | E02B 3/04 405/21 |
| 2015/0132060 A1 | 5/2015 | Stehling | |
| 2018/0058027 A1 | 3/2018 | Wilkinson | |

FOREIGN PATENT DOCUMENTS

| | | |
|---|---|---|
| KR | 10-2007-0030370 A | 3/2007 |
| KR | 10-0690364 B1 | 3/2007 |
| KR | 20080044222 A | 5/2008 |
| KR | 20-2009-0011788 U | 11/2009 |
| KR | 10-2010-0063881 A | 6/2010 |
| WO | 2009/017356 A2 | 2/2009 |
| WO | 2010/085075 A2 | 7/2010 |

OTHER PUBLICATIONS

Donald Burns, Field Inspection Report, May 31, 2015, pp. 1-32.
International Search Report and Written Opinion for Application No. PCT/KR2010/000350, dated Sep. 27, 2010, 12 pages.
Notice of Intent for Coastal Bank Stabilization, Geotechnical Environmental Water Resources Ecological, May 20, 2015, pp. 1-46.
Registered Order of Conditions, Provided by MassDEP: Oct. 30, 2015, pp. 1-27.
StormSmart Coasts, StormSmart Properties Fact Sheet 4: Bioengineering—Coir Rolls on Coastal Banks. Retrieved online at: www.mass.gov/czm/stormsmart. 9 pages, Dec. 2013.

* cited by examiner

TOP VIEW

SIDE VIEW

PERSPECTIVE VIEW

FRONT VIEW

EROSION CONTROL APPARATUS

This is a continuation-in-part application of International Application No. PCT/US2017/049717, filed Aug. 31, 2017, which claims priority to U.S. patent application Ser. No. 15/253,464, filed Aug. 31, 2016, the entire contents of which is incorporated herein by reference.

BACKGROUND OF THE INVENTION

Historically, conventional, or "hard engineering" structures have been used to defend against erosion from adjacent water courses or water bodies. While effective, these techniques have proven to have considerable undesirable physical impacts of increasing erosion to adjacent land forms or other "down-stream" natural resources. This is primarily due to the hardness of these structures which reflect and/or transmit the energy contained in waves, currents, and scour from moving water onto the nearby landforms which have not been "hardened" through the installation of structural elements. The reflection of waves, currents, and scour results in increased erosion of adjacent resources such as beaches, tidal areas, subsurface features immersed in water, river courses, lakebeds, and important upland land features which often protect other structures such as homes, roadways, and utilities.

To address damage to adjacent resources, many regulatory agencies, environmental advocacy organizations, and environmental contractors have embraced bioengineering and the "Living Shoreline" approach, which is now a nationally-known campaign by the National Oceanic and Atmospheric Administration (NOAA) in the United States of America. In some US states, state wetland regulations prohibit the use of conventional hard engineering structures to protect structures on properties. In these instances, "soft", bioengineering measures such as those promoted by the NOAA Living Shoreline program are the only alternatives available for coastal property owners. Unfortunately, bioengineering measures promoted by the Living Shorelines program are not robust or structurally sound enough to defend against erosion in portions of the shoreline which are exposed to higher intensity storms such as oceanfront areas, coastal bays, larger estuaries, larger rivers, and lakes.

Conventional, environmentally friendly bioengineering approaches for stabilizing the base of landforms along exposed shorelines can provide structural integrity at the toe of landforms near the shoreline in order to stabilize these landforms. While these approaches are all somewhat effective at stabilizing exposed landforms, they are generally believed to have much lower success when used along ocean fronting land forms, within larger estuaries, larger rivers, and along the shorelines of larger lakes. It is important to note that an effective and reliable strategy for soft bioengineering methodology presently does not exist for most of the oceanfront, larger estuaries, larger rivers, and along the shorelines of larger lakes. Therefore, the owners of real estate must rely on conventional hard engineering structures, which typically exacerbate shoreline erosion in nearby locations or must rely on substandard soft engineering alternatives which are not robust enough for the given site conditions and level of exposure.

SUMMARY OF THE INVENTION

The present invention addresses the problems of conventional bioengineering installations by providing an erosion control apparatus and methods of installing same. Fiber rolls and fabric encapsulated soil (FES) lifts are combined in anchored configurations together with synthetic mesh netting, to create bioengineered installations with greater durability, greater resistance to storm, sea and water erosion, and corresponding longer useful life, lengthening repair cycles and facilitating the repair process.

In some embodiments, an erosion control apparatus comprises a plurality of fiber rolls, wherein the rolls are arranged relative to a contour of a shoreline; a plurality of anchors coupled to the fiber rolls, the anchors inserted at a depth through the apparatus; a plurality of soil lifts comprising fiber, the soil lifts are connected to the fiber rolls. A mesh can comprise a layer contacting the soil lifts, wherein the anchors pass through the mesh and the soil lifts and optionally enter the soil underneath the apparatus. This operates to distribute the anchoring force across the system. The fiber rolls are situated directly over a plurality of anchors at different levels of the system so that coupling of the system elements causes compression and loading of the anchor system. Thus, the weight of the entire system serves to aid in the retention of the anchor placements.

The plurality of fiber rolls can comprise a coir fiber and can be either high density or low density. In an embodiment, the plurality of anchors are duckbill anchors. The anchors can be spaced at intervals across each fiber roll to distribute loading across the structure. Each anchor can include a cable or rod connected to an anchor point surface sized to support an overlying cone of material. In an embodiment, the intervals range from twenty-four inches to thirty inches, for example. In an embodiment, the anchors can be inserted at a depth of at least forty-two inches below a slope or grade of the apparatus and can provide at least three thousand pounds of holding force at each insertion point. The anchors preferably extend at an angle that is orthogonal to the plane of the rolls. However, certain embodiments can be configured such that the anchors extend at an angle that is within 45 degrees of the orthogonal direction, or preferably within 30 degrees of the orthogonal direction from the plane of the rolls.

The soil lifts can comprise at least one layer of coir fabric and may be configured to retain sediment. In some embodiments, the sediment is compacted and can have a depth of at least twelve inches. In some embodiment, the mesh contacting the soil lifts comprises polypropylene, polyethylene, or similar synthetic material. In other embodiments, the mesh comprises coir fiber.

In some embodiments, the apparatus further comprises at least a first trench at a highest end of the apparatus. In further embodiments, the apparatus further comprises a second trench located at a lowest end of the apparatus. Each trench can be backfilled with sand or soil. In some embodiments, the first trench and the second trench are at least six inches wide and at least six inches deep. In some embodiments, each trench is covered with sand or soil.

In some embodiments, the apparatus further comprises plant material on or with at least one fiber roll. The mesh may cover at least one of the fiber rolls. Additional lifts may be added over time to the apparatus by constructing more soil lifts on the top or side of the rolls. In some embodiments, the apparatus further comprises at least one erosion control blanket, which can optionally comprise a biodegradable material.

In some embodiments, a plurality of posts are placed along at least a front roll of the apparatus relative to the shoreline. The lifts may be secured with the posts or stakes.

In some embodiments, a method of installing erosion control apparatus comprises placing a mesh within an excavated site; placing a layer of coir fabric over the mesh; arranging a plurality of fiber rolls relative to a shoreline; connecting a plurality of soil lifts to the fiber rolls, the soil lifts comprising fiber; folding the mesh and the fabric over the soil lifts and the rolls; and inserting a plurality of anchors adjacent or coupled to the fiber rolls, the anchors being inserted at a depth, wherein each of the anchors passes through the mesh, the fabric, and at least one soil lift.

In further embodiments, the anchor system can include rocks, concrete, or other formed components that can be installed prior to placement of the soil lifts and/or fiber rolls. Cables or other coupling rods or elements can be attached to these anchor components by a formed loop in the cable, threaded eyelets or other fixtures suitable to connect the anchors to the rolls. Each anchor point can be attached to one or more fiber rolls. The connecting cables can be attached to the anchor points prior to placement of the soil lifts and fiber rolls. The cables can extend around or extend through slots in the soil lifts.

Generally, the space between the fiber rolls and the anchor points and related anchor surface area has a fill material. This fill material can include soil, rocks, and/or the soil lifts. The fill material is confined by the overlying fiber rolls which combine to load the anchor system. The system components are coupled to the anchoring system to substantially increase the stability of the system during storms and tidal or flooding events.

DETAILED DESCRIPTION OF THE INVENTION

Figure 1:
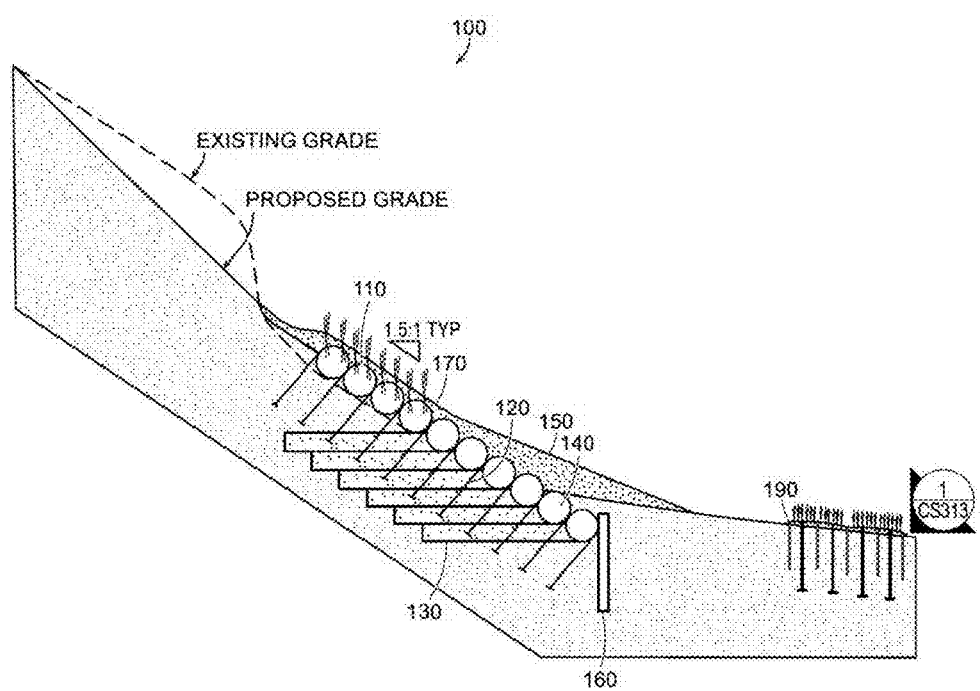
FIG. 1 is a side view of an erosion control apparatus, according to some embodiments.

Reference will now be made in detail to various embodiments of the disclosed devices and methods, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including", as well as other forms, such as "includes" and "included", is not limiting. Any range described herein will be understood to include the endpoints and all values between the endpoints.

Prior to this disclosure, there has not been a reliable and robust bioengineering method of stabilizing an exposed landform in locations of higher erosion risk, such as oceanfront, estuarine, riverfront, lakefront, and other features of land bordering a body of water.

The present disclosure incorporates the benefits of mass and weight of sediment-filled lifts and the benefits of fiber rolls to prevent sediment from liquefying and flowing through the fabric in storm or flooding events. The present disclosure also relies on anchoring the fiber rolls with the use of earth anchors. The earth anchors can include different structures such as helical-style anchors and duckbill-style anchors, provided they can be positioned below grade and provide superior holding power. In some embodiments, the earth anchors are produced by A. B. Chance Company located in Centralia, Mo. In some embodiments, the anchors are rock anchors such as those produced by MilSpec® Anchors located in Alexander City, Ala. In an embodiment, earth anchors provide a minimum of 3,000 pounds of holding force at each anchor point. In an embodiment, each element of the disclosed apparatus provides a minimum of 3,000 pounds of holding force. Anchor points are installed at intervals of approximately twenty-four to thirty inches along an edge of each fiber roll. In some embodiments, anchor points are installed at intervals of approximately twenty-four to ninety-six inches along an edge of each fiber roll. In an embodiment, the anchor points are installed every thirty inches from along the top and bottom edge of each fiber roll.

Prior to this disclosure, property owners were faced with choosing between substandard, soft bioengineering techniques which require frequent repairs or fail during storm conditions. Such conditions increase the forces of moving water on the bioengineering components or conventional engineering approaches which tend to reflect storm energy and exacerbate erosion damage to adjacent or down-stream natural resources. Neither conventional engineering approaches or prior bioengineering techniques were well-matched for sea level rise. Conventional engineering measures for erosion control do not support plants and often cannot be expanded in a modular technique without major foundational reconstruction. While fiber rolls and similar bioengineering methods provide good support for the root systems of plants, the inability to hold the fiber rolls in place during a storm event undermines the ability for plants to become established as the plants are damaged every time the array becomes dislodged. Successful bioengineering relies extensively on the integrity of the plant root systems for long-term performance.

The present disclosure not only provides substantially more structural integrity than any other bioengineering method for shoreline protection, but due to its superior structural integrity and ability to support plant growth, the important role plants play in all bioengineering designs is enhanced and secured on a substantially longer timeframe. The disclosed apparatus are also readily expandable, making it possible to increase the number of lifts over time by simply constructing more lifts on the top or sides of the array without making any other structural changes to the array or damaging the supporting bioengineering materials and plants. In some instances, more than one apparatus can be installed at the same site vertically, horizontally, or a combination thereof. Conversely, conventional engineering methods such as sea walls often require substantial increases in their foundation or embedment below grade before their height can be increased. The expandability of the present disclosure makes it a preferred alternative in marine environments undergoing sea level rise.

The disclosed apparatus, in some embodiments, is installed in a site above ground water in the surrounding soil. In other embodiments, the lowest section of the disclosed apparatus is inserted no more than one foot into ground water.

FIG. 1 is a side view of an erosion control apparatus, according to some embodiments. The apparatus 100 comprises at least one coir fiber roll 110. The coir fiber rolls 110 may be either high density or low density. For one example, 20" diameter by 10' long, high density fiber rolls are measured at a nine pound per cubic foot density, comprised of a mattress of inner coir fibers encased in a UV stabilized synthetic polypropylene mesh. Alternatively, the high density fiber rolls are comprised of a mattress of inner coir fibers encased in a 100% biodegradable coir rope mesh. In a further example, 20" diameter by 20' long, low density fiber rolls are measured at a seven pound per cubic foot density, comprised of a mattress of inner coir fibers encased in a UV stabilized synthetic polypropylene mesh. In some embodiments, some or all of the low density fiber rolls are 20" diameter by 10' long.

The coir fiber rolls 110 are arranged along a shoreline, riverbank, lakefront, or other waterfront. The soil behind the coir fiber rolls 110, relative to the shoreline, riverbank, lakefront, or other waterfront, may be graded. In some embodiments, the soil is graded at a slope angle in a range of 0 to 45 degrees (1:1 slope). In an embodiment, the soil is graded at a slope angle in a range of 20 to 50 degrees. In a further embodiment, the soil is graded at a slope angle no greater than 33 degrees (2:1 slope). The slope angle may be 33, 34, 35, 36, 37, 38, 39, 40, 41, 42, 43, 44, 45, 46, 47, 48, 49, or 50 degrees, or any angle in between. In some embodiments, the soil of the apparatus 100 can include varying slope angles throughout the apparatus 100. The coir fiber rolls are described in greater detail below with respect to FIG. 4. Varying slope angles are described in greater detail below with respect to FIGS. 5A and 5B.

The coir fiber rolls 110 are anchored with the use of anchors 120. The anchors 120 may be referred to as "earth anchors" and may be helical-style anchors, duckbill-style anchors, or any other type of anchor that can be driven below grade. The anchors 120 are inserted at a specified depth into the soil lifts 130 or the soil underneath the apparatus 100. In some embodiments, the anchors 120 are inserted adjacent to the plurality of the coir fiber rolls 110. In an embodiment, each anchor 120 provides a minimum of three thousand pounds of holding force. The distribution of anchors is described with more detail with respect to FIGS. 6A-6D.

In an embodiment, the anchors 120 are installed across a face of the coir fiber rolls 110. In some embodiments, the anchors 120 are inserted adjacent to the coir fiber rolls 110 to secure the coir fiber rolls 110. In some embodiments, the anchors 120 are inserted adjacent to multiple coir fiber rolls 110. The anchoring system of the apparatus 100 further comprises ¼" galvanized aircraft cable 116 and zinc-coated copper crimps. The crimps are used to form a loop in the cable 116. Cables 116 are attached to each earth anchor 120 by forming a loop with a crimp. One cable 116 may be joined to another cable 116 by securing two loops together. These cables 116 form a network of cables 116 which harness the coir fiber rolls 110 and all tie back to the individual anchors 120 to create a high degree of integrity. The anchors 120 are placed to a depth of at least 42" below finished slope grade into naturally or artificially compacted soil using a hardened steel driving rod. Deeper anchor placements can be used with greater slope angles or more exposed formations.

The apparatus 100 further comprises a plurality of fiber encased soil lifts 130. The soil lifts 130 can comprise two layers of seven hundred-gram (or heavier) woven coir fabric encased by high tenacity polypropylene or polyethylene synthetic mesh 140 that is resistant to ripping. The soil lifts 130 are configured to retain sediment and allow the sediment to naturally compact within the soil lift 130. All sediment in each soil lift 130 preferably has a consistent depth of approximately 12", but the depth of each soil lift 130 can vary across the apparatus 100. The sediment in each soil lift 130 can be compacted using a portable plate compactor at 6" soil depth intervals.

In some embodiments, each soil lift 130 in an apparatus 100 is of uniform length. In some embodiments, the length of each soil lift 130 is four feet. In some embodiments, the length of each soil lift 130 is eight feet. In some embodiments, the top soil lift 130 has a length of eight feet and each other soil lift 130 has a length of four feet.

The soil lifts 130 are connected to the coir fiber rolls 110. Additional soil lifts 130 can be added to the apparatus 100 over time by constructing the additional soil lifts 130 onto the top of the coir fiber rolls 110, for example. The completed series of coir fiber rolls and soil lifts may be referred to as a protection array, configured to protect a shoreline. In some embodiments, the coir fiber rolls 110 are incorporated into, or encapsulated within, the soil lifts 130.

In some embodiments, the soil lifts 130 can optionally be coupled to one another by fasteners or coupling elements 108 such as stakes, hog rings, or clips. As an example, hog rings may be inserted through two adjacent soil lifts 130 and subsequently bent with pliers, or other manipulation means, to bend the hog rings into a circular shape to couple the adjacent soil lifts 130. In some embodiments, the fasteners or coupling elements 108 are stainless steel. In some embodiments, rope is weaved through the surface of adjacent soil lifts 130 to couple the soil lifts 130. The fasteners or coupling elements 108 serve to mechanically couple the soil lifts 130 together.

The synthetic mesh 140 is incorporated as an outward layer of fabric used for developing fabric encased soil lifts. In some embodiments, the mesh 140 comprises raschel polypropylene knotless netting, 3 mm high tenacity (rip resistant), 1½" mesh opening, with enhanced UV stabilization. In other embodiments, the mesh 140 comprises polyethylene. In other embodiments, the mesh 140 comprises 100% biodegradable coir fabric. In some embodiments, the mesh opening can range from ½" to 7". In an embodiment, the mesh 140 covers the coir fiber rolls 110 that are not filled with plant material 170. In a preferred embodiment, the netting is not photo-degradable. The earth anchors 120 pass through the mesh 140 and soil lifts 130 into the soil beneath. In some embodiments, the synthetic mesh 140 can be substituted with a layer of coir fabric.

After installation of the mesh 140, the coir fiber rolls 110 covered by the mesh 140 are at least partially covered by sand 150. In an embodiment, the first six coir fiber rolls 110 relative to the shoreline, riverbank, lakefront, or other waterfront are at least partially covered by the mesh 140 and sand 150. The number of coir fiber rolls 110 covered by the mesh 140 and sand 150 may be adjusted based on the conditions of the site of the apparatus 100. The inclusion of sand 150 is described in more detail below with respect to FIGS. 7A and 7B.

A plurality of posts 160 may be placed at intervals along at least the front coir fiber roll 110 of the apparatus 100 relative to the shoreline, riverbank, lakefront, or other waterfront. The posts 160 provide additional support for the apparatus 100. In an embodiment, the posts 160 may be 4" by 4" or 6" by 6", and spaced at 5 foot intervals along the first coir fiber roll 110. In some embodiments, the apparatus 100 does not include posts 160.

In some embodiments, coir fiber rolls 110 not covered by the mesh 140 are filled with plant material 170. In other embodiments, at least one of the coir fiber rolls 110 covered by the mesh 140 or incorporated into the soil lifts 130 are filled with the plant material 170. The plant material 170 may be any vegetation with suitable roots for securing the apparatus 100 from eroding. In an embodiment, the plant material 170 is American beachgrass. In other embodiments, the plant material 170 may be any native plantings appropriate to the site conditions, which will grow quickly and stabilize the landform.

In some embodiments, the apparatus 100 includes marsh pillows 190. The pillows 190 may be installed between the apparatus 100 and the shoreline. The pillows 190 are described in greater detail below with respect to FIG. 8.

Figure 2:
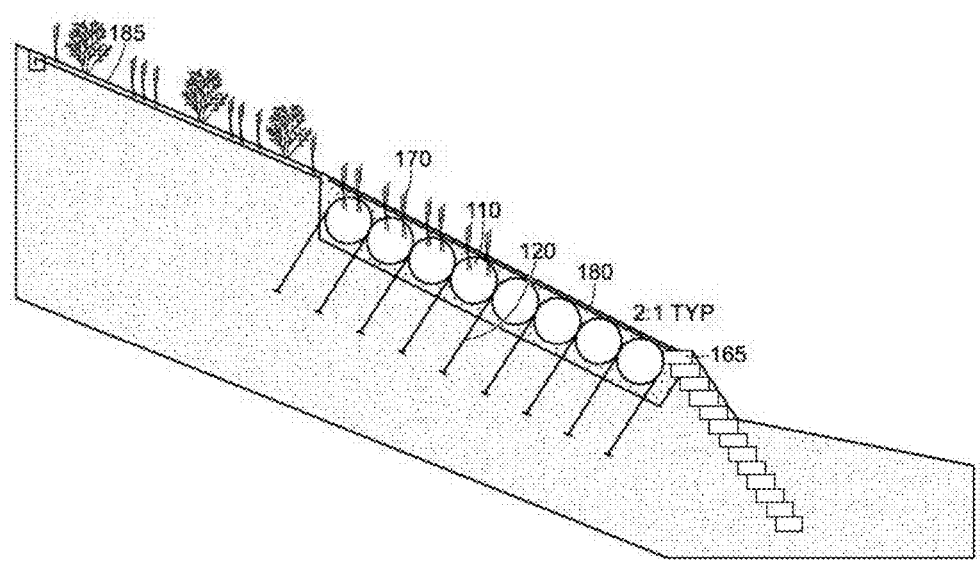
FIG. 2 is a side view of an erosion control apparatus including wire baskets, according to some embodiments.

FIG. 2 is a side view of an erosion control apparatus 100, according to some embodiments. In these embodiments, the apparatus 100 includes at least one wire basket 165. In some embodiments, the wire basket 165 is a vinyl coated, welded, and galvanized gabion. The wire basket may be utilized as a substitute of the anchor posts 160 or in conjunction with the anchor posts 160. In some embodiments, the dimensions of the wire baskets 165 are at least 1'×2'×6". The wire baskets 165 can be filled with heavy materials such as rock or shells.

In an embodiment, the apparatus 100 further comprises at least one erosion control blanket 180. In an embodiment, the blanket 180 is biodegradable and may degrade over approximately a three year period. In a further embodiment, the blanket 180 comprises coir fiber netting. The blanket 180 may be secured with the posts 160. In some embodiments, the blanket 180 may be secured with the earth anchors 120. If multiple blankets are employed, an interior blanket is typically a straw/coir/jute, short term, composite erosion control blanket and an exterior blanket is typically 700 or 900-gram woven coir fabric. The blanket 180 is further configured to provide UV protection to the coir fiber rolls 110. The blanket 180 is further configured to prevent chafing between the coir fiber rolls 110 and the cables 116 during storm events.

In an embodiment, a composite erosion control blanket 185 is installed within forty-eight hours of grading the soil above (up gradient) the coir fiber rolls 110 relative to the shoreline, riverbank, lakefront, or other waterfront. In an embodiment, the composite erosion control blanket 185 is secured with a first trench located at a first end of the apparatus 100, the first end being positioned substantially parallel to the shoreline and at a highest end of the apparatus 100 furthest from the shoreline. In a further embodiment, the mesh 140 is secured with a second trench at a second end of the apparatus 100, the second end being positioned substantially parallel to the shoreline and at a lowest end of the apparatus 100 closest to the shoreline. In an embodiment, the trenches are 6"×6" (that is at least six inches wide and six inches deep) lock-in trenches at the top and bottom of the slope with a minimum of 6" overlaps in the transition from one horizontal width of erosion control blanket to the next. 30" hardwood stakes 135 can be used at a spacing of 36" on center with ¼" biodegradable twine used to secure the composite 185 to the ground surface. The trenches may be backfilled, seeded, and lightly mulched with sterilized, weed-free chopped straw or comparable equivalent mulch product.

Figure 3:
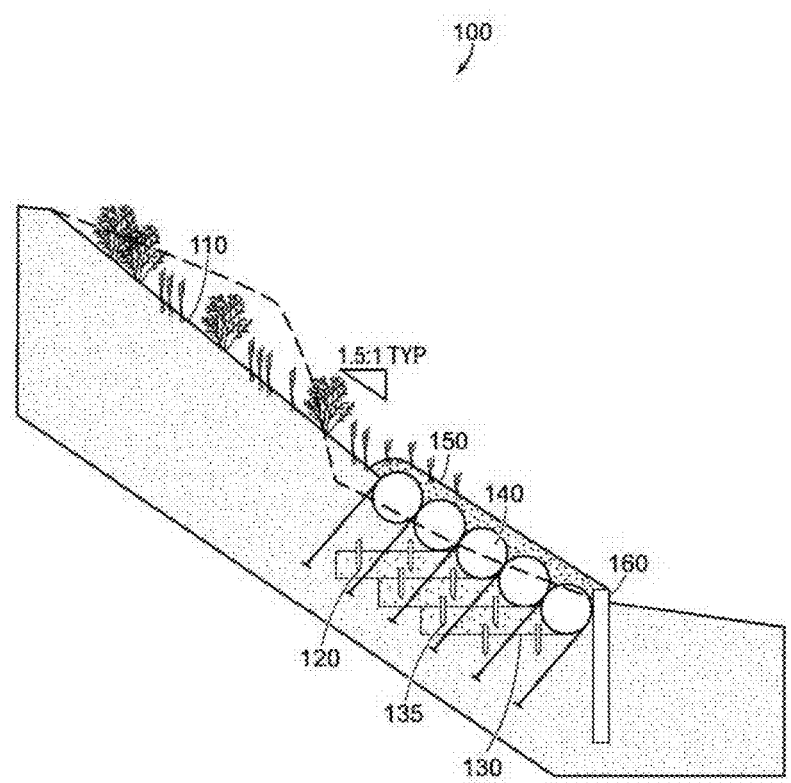
FIG. 3 is a side view of an erosion control apparatus including stakes, according to some embodiments.

FIG. 3 is a side view of an erosion control apparatus 100, according to some embodiments. In some embodiments, the apparatus 100 includes at least one stake 135. The stakes 135 may be inserted through the soil lifts 130. The stakes are described in more detail below with respect to FIG. 9.

Figure 4:
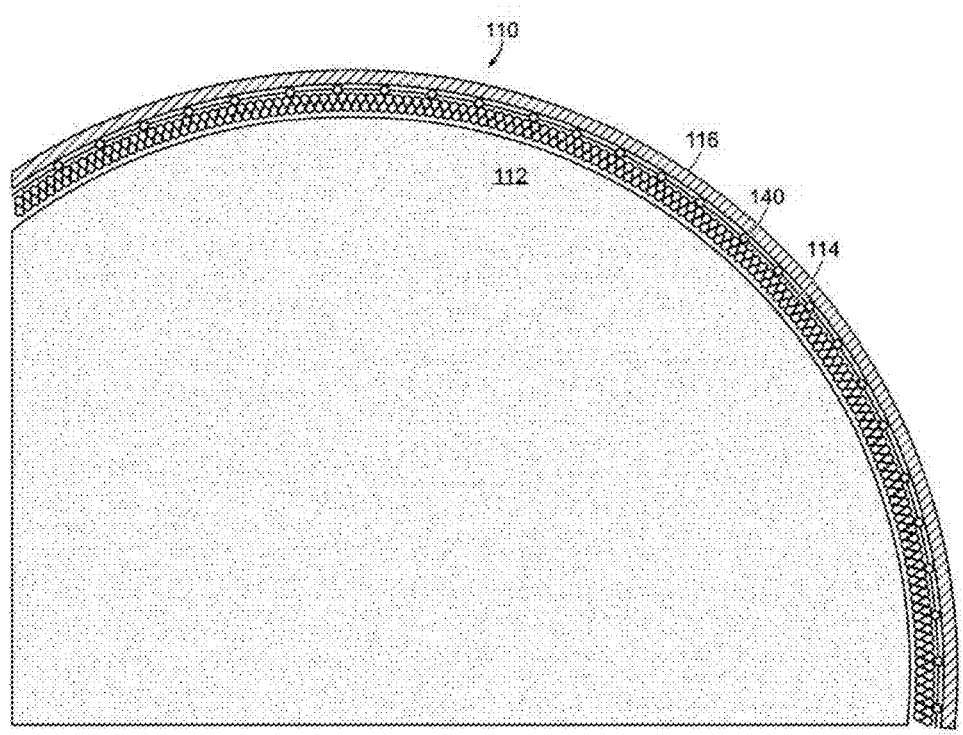
FIG. 4 is a close-up side view of a coir fiber roll according to some embodiments.

FIG. 4 is a close-up side view of a coir fiber roll 110 according to some embodiments. A coir fiber roll 110 includes an inner portion 112 of coir fiber. In some embodiments, the inner portion 112 of coir fiber is 20" in diameter. The inner portion is surrounded by a layer 114 of coir fabric. In some embodiments, the weight of the layer 114 of coir fabric may range between seven hundred to nine hundred grams. The layer 114 of coir fabric may be covered by the mesh 140. Cables 116 may be secured around the mesh 140. The cables 116 are attached to the anchors 120. In some embodiments, the cables 116 are spaced at two and a half feet distances across the coir fiber rolls 110.

Figure 5A:
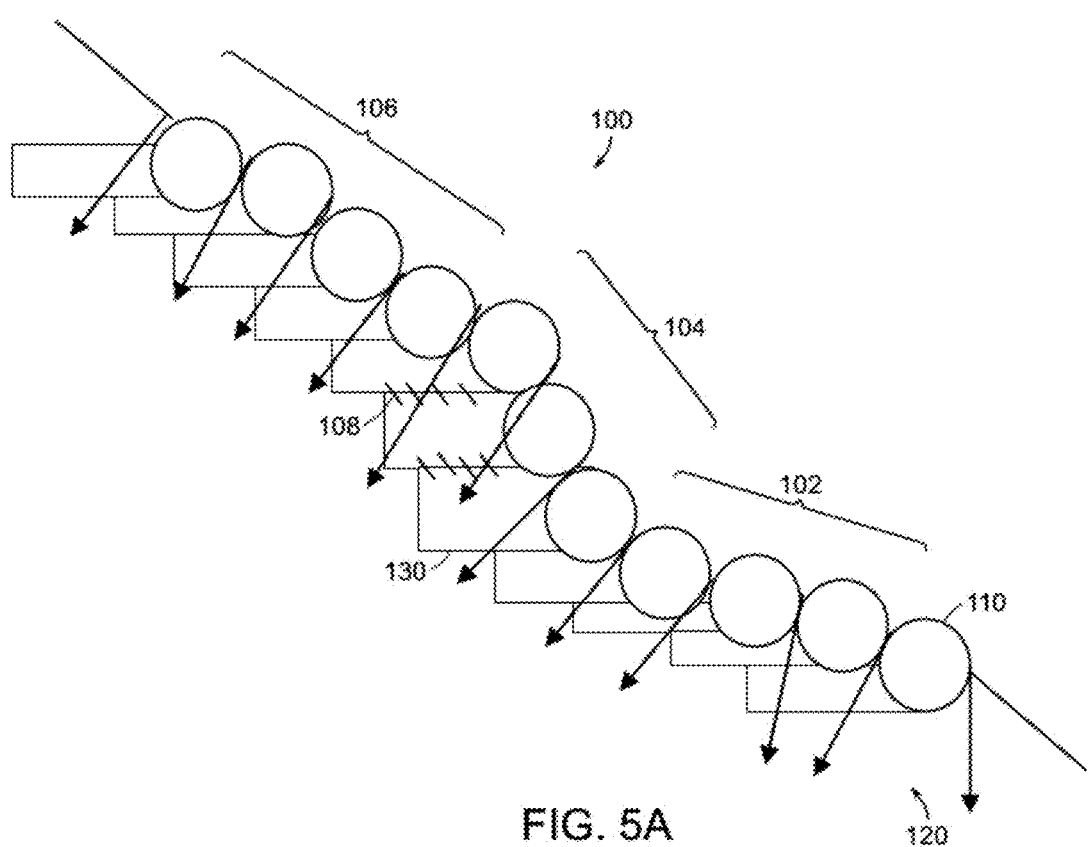
FIG. 5A depicts a side view of an erosion control apparatus including multiple slope angles, according to some embodiments.

FIG. 5A depicts a side view of an erosion control apparatus including a plurality of slope angles, according to some embodiments. The coir fiber rolls 110 may be arranged at varying slopes throughout the apparatus 100. The preferred configuration of the coir fiber rolls 110 may be determined based on the factors such as the shape of the shoreline at the excavation site, the anticipated forces the apparatus 100 will endure, and the desired slope after insertion of the apparatus 100. An embodiment can use a first contiguous set of rolls 102 at a first slope angle, a second contiguous set of rolls 104 at a second slope angle that is steeper than the first set, extending at a greater angle, and a third set contiguous set of rolls 106 can be at a third angle that is situated at a greater or lesser angle as required.

The soil behind the coir fiber rolls 110, relative to the shoreline, riverbank, lakefront, or other waterfront, may be graded. In some embodiments, the soil is graded at the same slope angle as the coir fiber rolls 110. In some embodiments, the soil is graded at a different slope angle than the coir fiber rolls 110. The coir fiber rolls 110 and/or the soil may be graded at a slope angle in a range of 0 to 45 degrees (1:1 slope). In an embodiment, coir fiber rolls 110 and/or the soil is graded at a slope angle in a range of 20 to 50 degrees. In a further embodiment, coir fiber rolls 110 and/or the soil is graded at a slope angle no greater than 26.6 degrees (2:1 slope). In a further embodiment, coir fiber rolls 110 and/or the soil is graded at a slope angle no greater than 18 degrees (3:1 slope). The slope angle may be 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 degrees, or any angle in between. In some embodiments, the soil of the apparatus 100 can include varying slope angles throughout the apparatus 100.

Figure 5B:
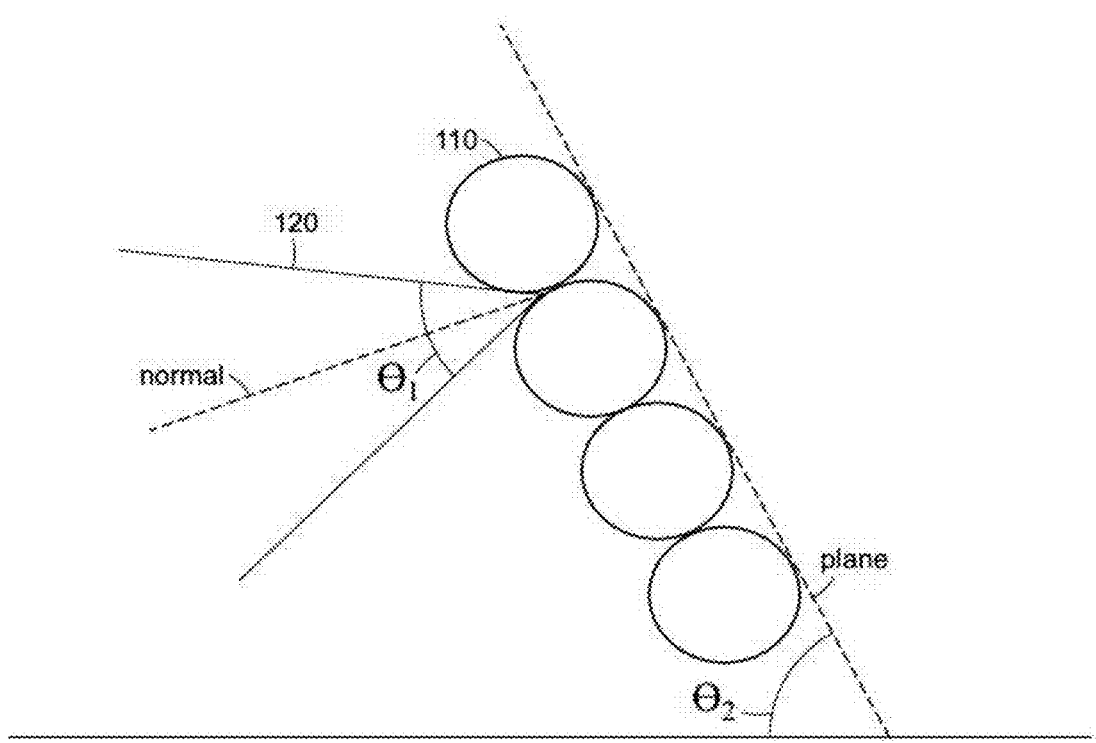
FIG. 5B depicts a side view of a section of an erosion control apparatus and the angular positioning of elements of the apparatus, according to some embodiments

Each anchor 120 may be inserted at varying angles throughout the apparatus 100. FIGS. 5A and 5B depict multiple anchors 120 inserted at various angles with the cable passing through one or more elements of the apparatus 100. An anchor 120 may be inserted with the cable oriented at an angular range $\theta_1$ relative to the slope angle of the soil at the insertion point of the anchor 120 or, if different, the slope angle $\theta_2$ of the coir fiber rolls 110. An anchor 120 may be inserted as described previously herein in a direction orthogonal to the soil grade or coir fiber rolls 110. An anchor 120 may be inserted at an angle up to 45 degrees relative to the orthogonal direction (normal) to the plane. In some embodiments, an anchor 120 may be inserted up to 10 degrees relative to the orthogonal direction or plane. In some embodiments, an anchor 120 may be inserted up to 20 degrees relative to the orthogonal direction. In some embodiments, an anchor 120 may be inserted up to 30 degrees relative to the orthogonal direction. In some embodiments, an anchor 120 may be inserted up to 40 degrees relative to the orthogonal direction.

The anchors 120 may all be inserted at the same angle throughout the apparatus 100 or the insertion angle of the anchors 120 may vary throughout the apparatus 100. In some embodiments, each anchor 120 is inserted at the same angle relative to the orthogonal plane. In some embodiments, each anchor 120 is inserted at varying angles relative to the orthogonal plane. In such embodiments, some of the anchors 120 may be inserted at similar angles relative to the orthogonal plane.

In some embodiments, the anchor 120 inserted closest to the shoreline may be inserted vertically. A vertical anchor 120 is advantageous when the apparatus 100 is installed above a seawall, bulkhead, or other traditional structure used to reduce erosion from adjacent water courses or water bodies to connect the apparatus 100 to the seawall, bulkhead, or other traditional structure.

An anchor 120 may secure one or more coir fiber rolls 110. In some embodiments, an anchor 120 may pass through one or more soil lifts 130. In some embodiments, an anchor 120 may pass through the mesh 140 and sand 150. In some embodiments, each individual anchor 120 may secure the same or different elements of the apparatus 100 as other anchors 120.

FIG. 5B depicts a side view of a section of an erosion control apparatus and the angular positioning of elements of the apparatus, according to some embodiments. The one or more coir fiber rolls 110 are installed along a plane (depicted in FIG. 5B) relative to a base layer of earth. Sections of the apparatus 100 may be installed along multiple planes. The angle between such a plane and the base layer is labeled as $\theta_2$.

Each anchor 120 is inserted at an angle relative to a plane relative to a base layer of earth. The insertion angle of the anchor 120 may be normal (orthogonal) to a plane as depicted in FIG. 5B. In some embodiments, an anchor 120 is inserted an angle relative to the normal. The angle of the anchor 120 is labeled as $\theta_1$. In some embodiments, each anchor 120 is inserted at an angle within 30 degrees of the normal. An anchor 120 includes a rod or cable that extends at the defined angle.

Figure 6A:
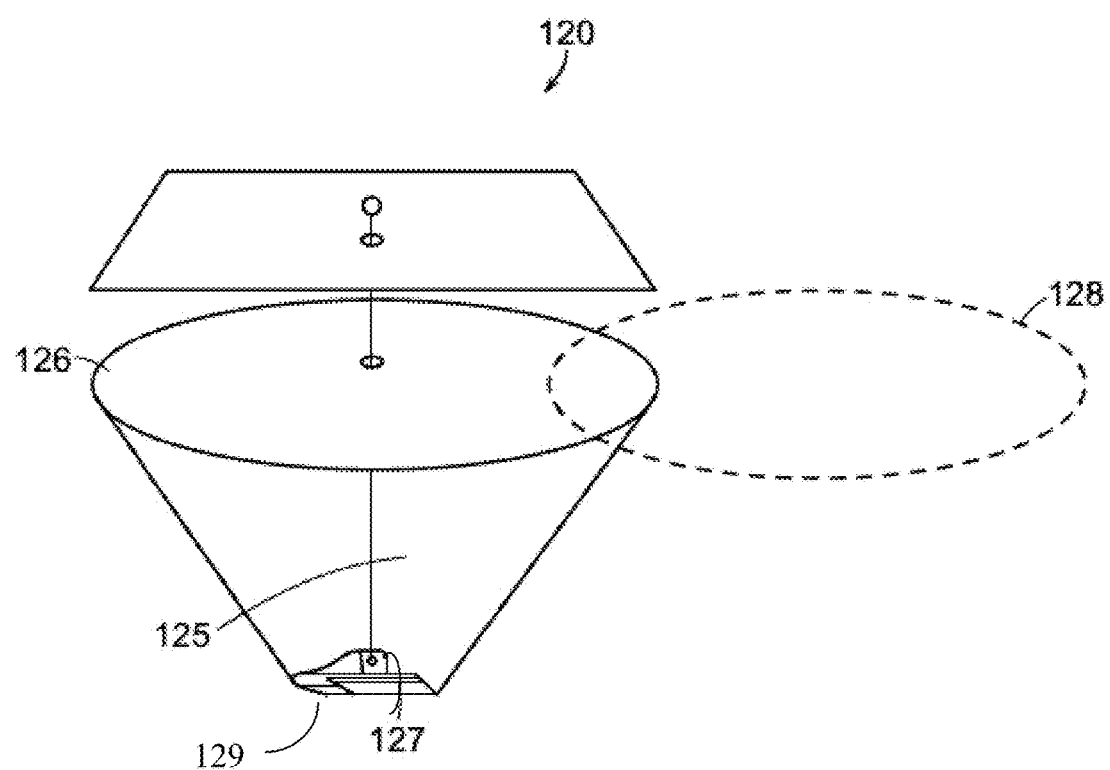
FIG. 6A depicts a side view of an anchor's load according to some embodiments.

FIG. 6A depicts a side view of an anchor's load according to some embodiments. In some embodiments, an anchor 120 is driven into the soil at a ninety-degree angle relative to the soil. In some embodiments, an anchor 120 is locked into place by applying stress to the anchor tendon 125, the connecting segment or element of the anchor 120 in the opposite direction to which the anchor 120 was driven. The tendon 125 is generally a steel aircraft cable or a metal rod. The anchor 120 rotates ninety degrees and a frustum cone 126 of soil is formed as the soil is compacted and bonded. The frustum cone 126 enables an anchor 120 to support a large load. In some embodiments, each anchor 120 supports three thousand pounds of force.

The anchors 120 utilized in the apparatus 100 may be helical-style anchors, duckbill-style anchors, or any other type of anchor that can be driven below grade. In a preferred embodiment, the apparatus utilizes duckbill-style anchors. In some embodiments, the anchors 120 may be installed approximately every twenty-four to thirty inches along the top and bottom edge of each coir fiber roll 110.

The density of the anchors 120 per square foot is dependent on the height of the apparatus 100. In an embodiment with 2.5' and 3.3' spacing between the center axes of adjacent coir fiber rolls 110, the apparatus includes three to four cables 116 per coir fiber roll 110. Therefore the range of anchor density for an apparatus 100 from one coir fiber roll 110 high to one hundred coir fiber rolls 110 high is generally in a range of eighteen to forty-eight anchors 120 per one hundred square feet.

In an embodiment including four cables 116 per 10' coir fiber roll 110, the anchor density can be twenty-four to forty-eight anchors 120 per one hundred square feet. In embodiment including one coir fiber roll 110, the anchor density can be thirty-six to forty-eight anchors 120 per one hundred square feet. In an embodiment including five coir fiber rolls 110, the anchor density can be twenty-two to twenty-nine anchors 120 per one hundred square feet. In an embodiment including ten coir fiber rolls 110, the anchor density can be twenty to twenty-six anchors 120 per one hundred square feet. In an embodiment including one hundred coir fiber rolls 110, the anchor density can be eighteen to twenty-four anchors 120 per one hundred square feet.

In one embodiment, at least twenty to twenty-nine anchors 120 are inserted per one hundred square feet. In an embodiment, the anchors 120 are driven into the soil by a hydraulic hammer. Typically, the anchors 120 have a distal portion comprising an anchor point 127 that can comprise a duckbill or helical segment, or a plate, for example. This anchor point 127 has a surface area 129 that supports a cone shaped load 126 of overlying soil and structure. The anchor point 127 surface area 129 is preferably at least four square inches or larger. The anchors 120 are positioned so that the cone shaped load 126 at least overlaps the cone 128 of an adjoining anchor 120.

Figure 6B:
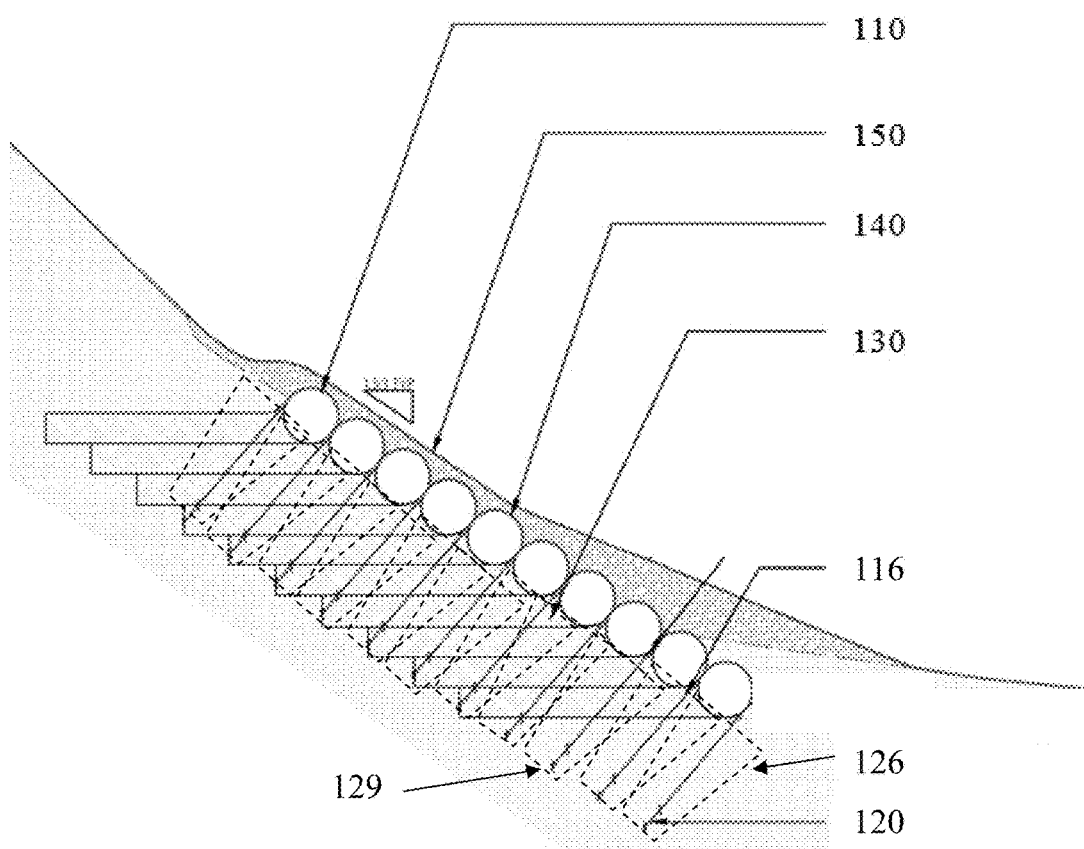
FIG. 6B depicts a side view of an anchor's load in an apparatus according to some embodiments.
Figure 6C:
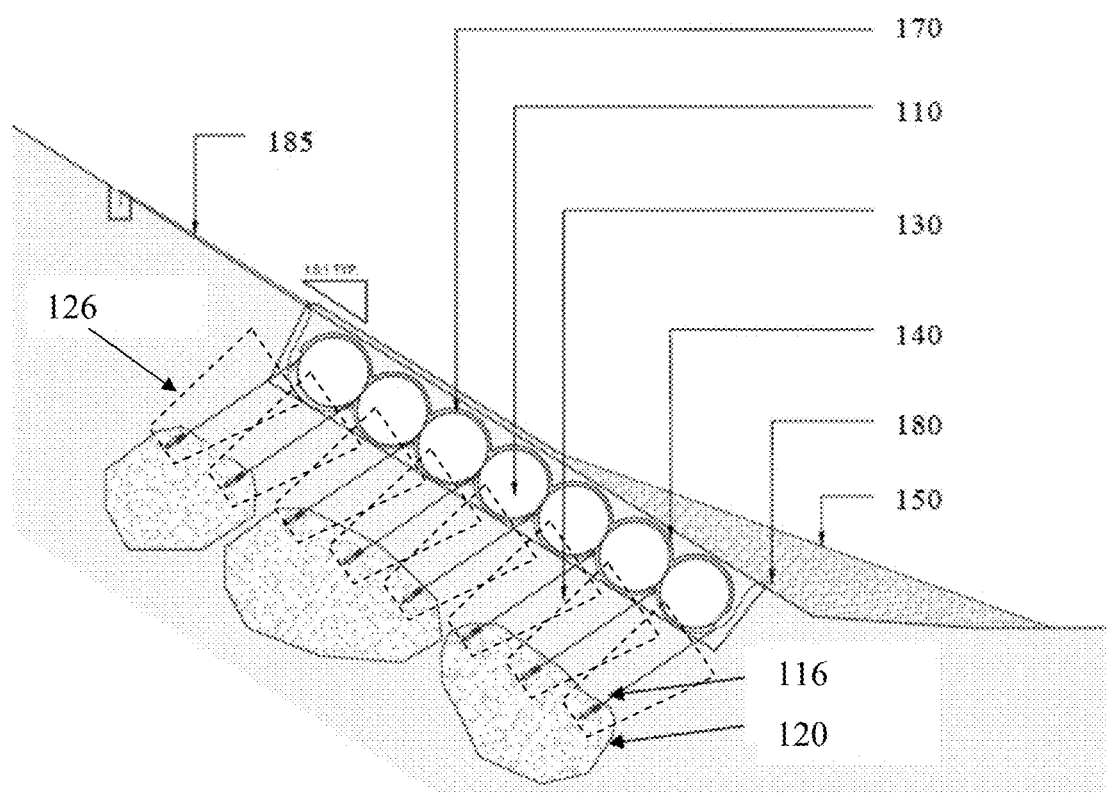
FIG. 6C depicts a side view of an anchor's load in an apparatus with reinforced anchoring elements according to some embodiments.
Figure 6D:
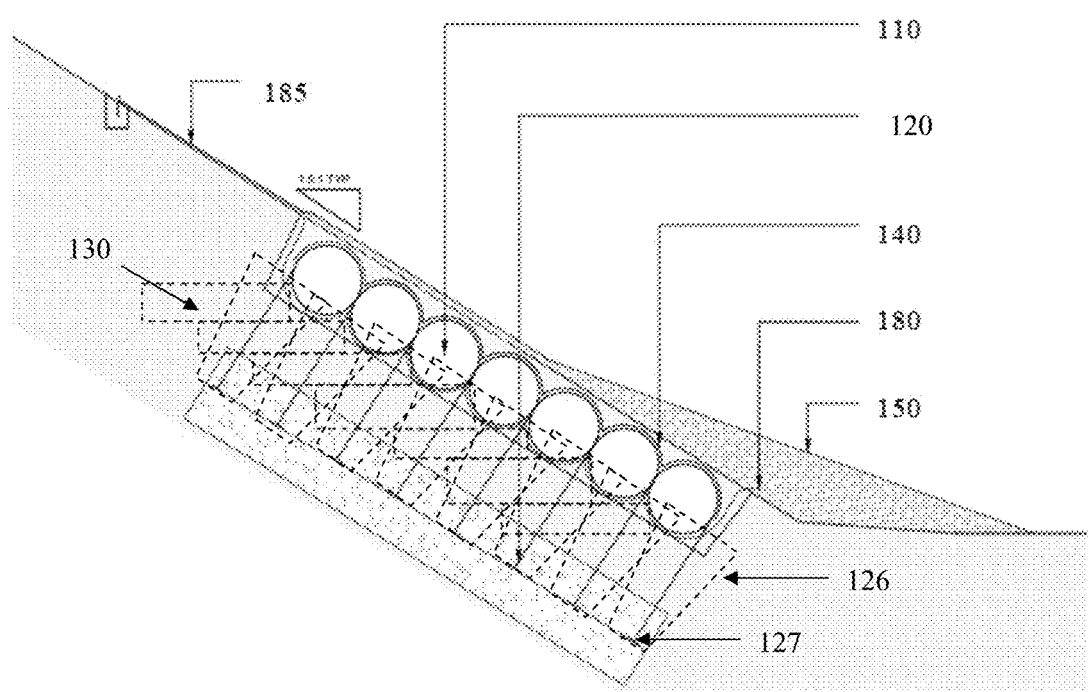
FIG. 6D depicts a side view of an anchor's load in an apparatus including concrete according to some embodiments.

FIG. 6B depicts overlapping frustum cones 126 in an apparatus according to some embodiments, FIG. 6C depicts overlapping frustum cones 126 in an apparatus with reinforced anchoring elements according to some embodiments, and FIG. 6D depicts overlapping frustum cones 126 in an apparatus with concrete according to some embodiments. The overlapping frustum cones 126 provide reinforced support across the apparatus 100 as multiple anchors support the overlapping sections. Each frustum cone in FIG. 6B originates from an anchor point surface area 129. Each frustum cone in FIG. 6C and FIG. 6D originates from an anchor point 127 embedded in a reinforcement element. The cones 126 depicted in FIGS. 6B, 6C, and 6D are illustrative and do not necessarily portray the exact load supported by each anchor. This will depend on the effective loaded surface area of the anchoring system.

In a further embodiment, the anchors 120 are driven into the soil by an impact of eighteen ft/lb of impact energy at a rate of two thousand three hundred (2300) blows/minute, for example. This impact energy can vary depending on soil conditions and the anchor depth requirements at a given installation.

Figure 7A:
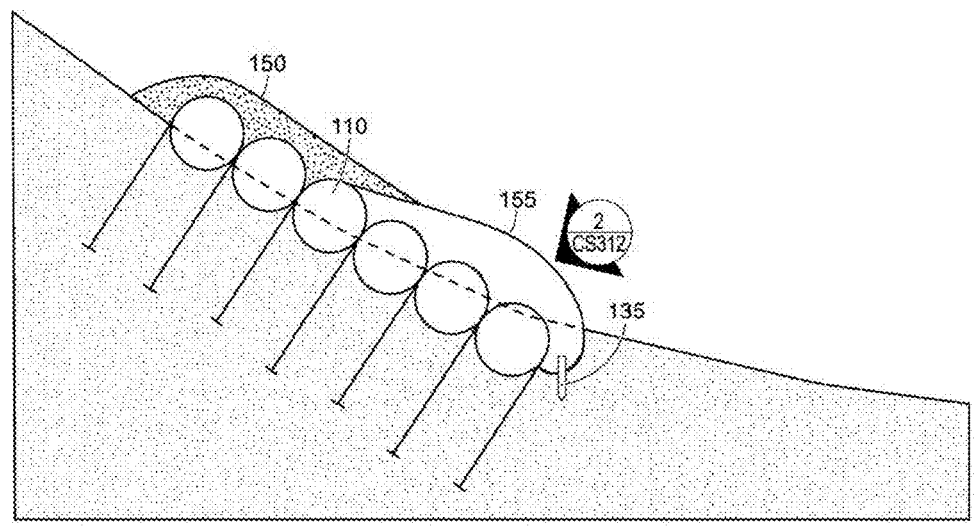
FIGS. 7A and 7B are side views of coir fiber rolls covered in sand according to some embodiments.
Figure 7B:
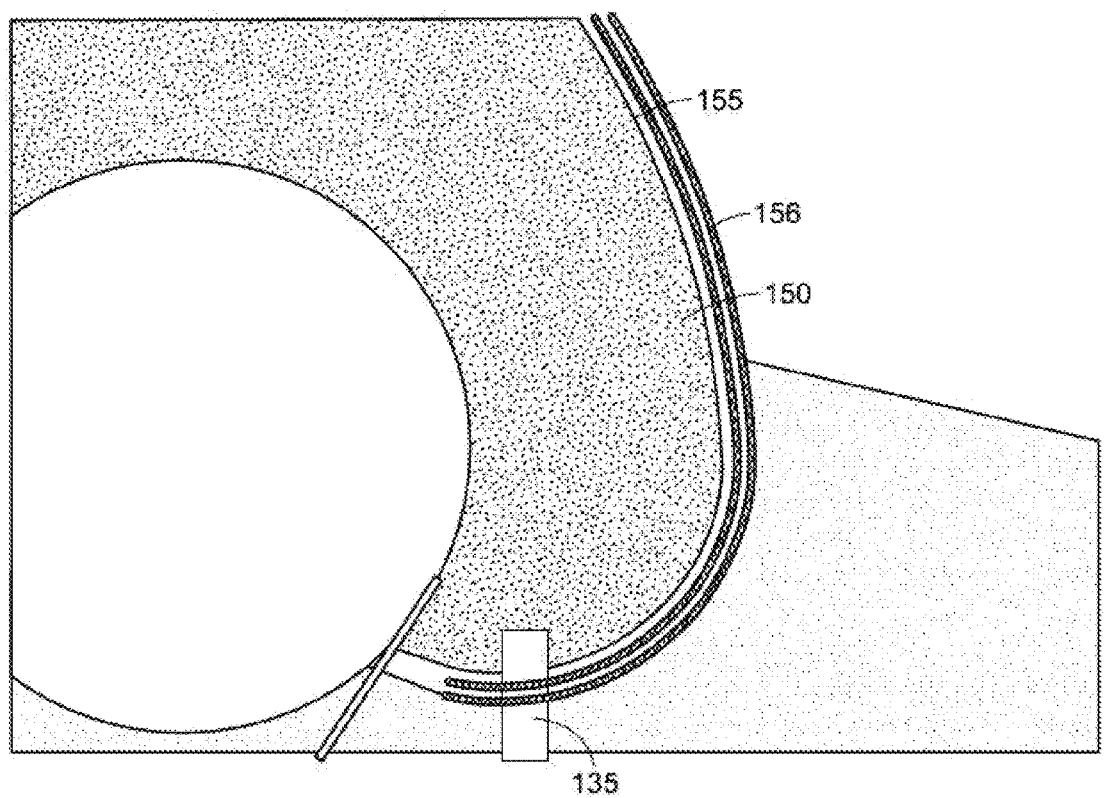

FIGS. 7A and 7B are side views of coir fiber rolls 110 covered in sand 150 according to some embodiments. The coir fiber rolls 110 may be covered solely by sand 150, by sand 150 within a burlap layer 155, or a combination of sand 150 and burlap 155. In some embodiments, the burlap layer 155 is covered by two layers of coir fiber 156. The burlap layer 155 and the two layers of coir fiber 156 may be secured in the soil by at least one stake 135. The burlap layer 155 may be biodegradable. In some embodiments, coir fiber rolls 110 disposed closer to the shoreline are covered by sand 150 with the burlap layer 155 and the coir fiber rolls disposed furthest from the shoreline are covered by sand 150.

Figure 8:
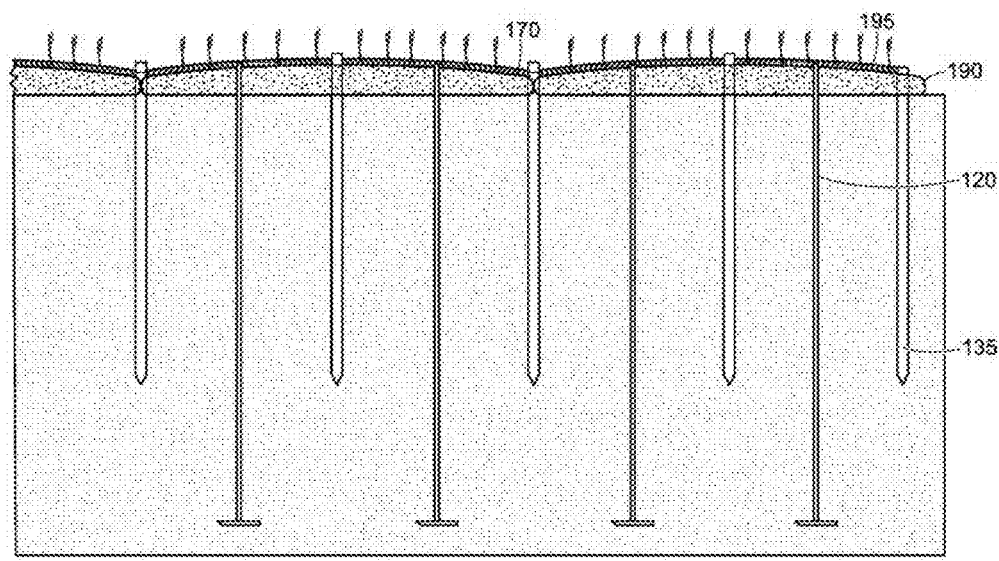
FIG. 8 is a side view of marsh pillows or containers according to some embodiments.

FIG. 8 is a side view of marsh pillows or containers 190 according to some embodiments. In some embodiments, the marsh pillows 190 are disposed between the coir fiber rolls 110 and the shoreline. In some embodiments, the marsh containers 190 are composed of coir material filled with loose coir fiber and compost. In some embodiments, the marsh containers 190 range from 2"-7" thick and 1'-6' wide. In further embodiments, the marsh containers 190 range from 4"-5" thick and 3'-4' wide. In some embodiments, the marsh containers 190 are surrounded by biodegradable rope 195.

The marsh containers 190 may be secured to the soil by an anchor 120, a stake 135, or combinations thereof. In some embodiments, the marsh containers 190 are fastened to cables 116 with four anchors 120 per marsh container 190 In some embodiments, the marsh containers 190 are filled with plant material 170. In further embodiments, the plant material 170 may be maritime grasses native to the shoreline.

Figure 9:
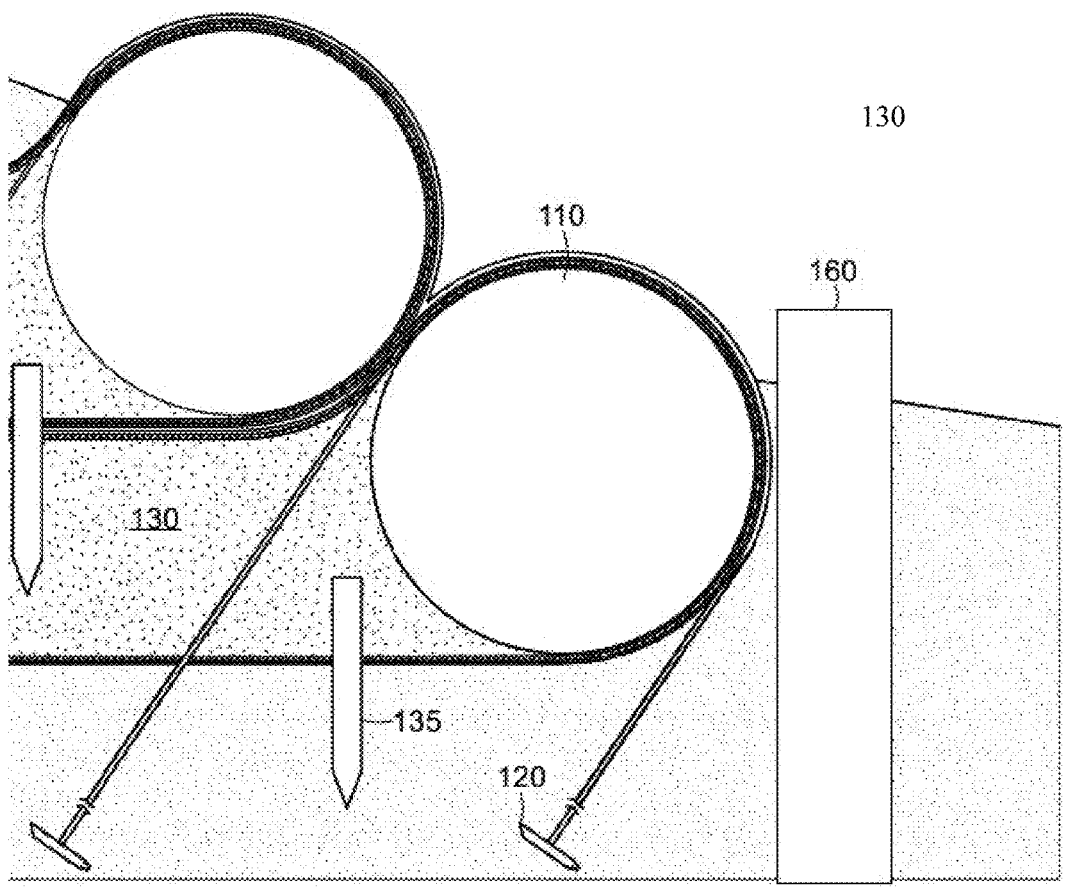
FIG. 9 is a side view of stakes utilized in an erosion control apparatus according to some embodiments.

FIG. 9 is a side view of stakes 135 utilized in an erosion control apparatus 100 according to some embodiments. At least one stake 135 is driven through each soil lift 130. The stakes 135 may be driven through a soil lift 130 into the soil or driven through a first soil lift 130 into another soil lift 130 disposed beneath the first soil lift. In some embodiments, the stakes 135 are wooden stakes. In some embodiments, the stakes 135 may be substituted with earth anchors such as duckbill anchors. The soil lifts 130 can have apertures or slots through which the anchors are inserted or enable cable placement through the apertures or slots, or between soil lift containers that are positioned after anchor placement.

Figure 10A:
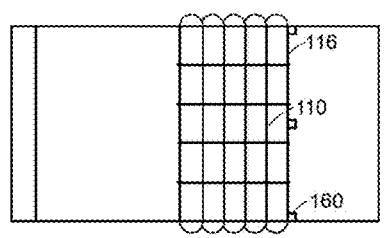
FIGS. 10A, 10B, 10C, and 10D are a top view, side view, perspective view, and a front view of an assembled apparatus according to some embodiments.
Figure 10B:
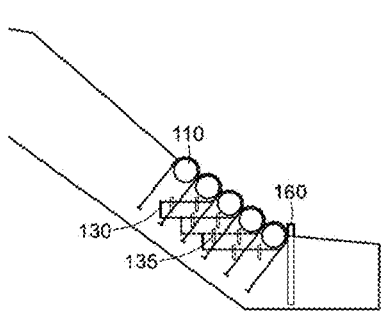
Figure 10C:
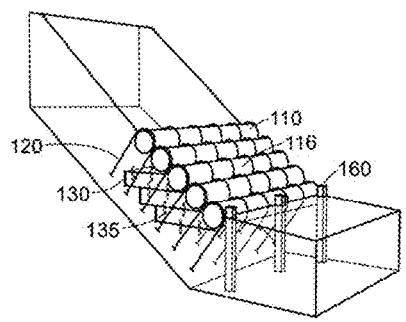
Figure 10D:
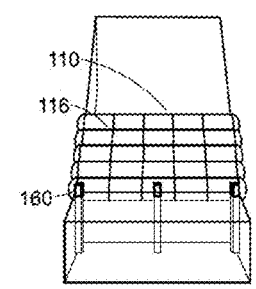

FIGS. 10A, 10B, 10C, and 10D are a top view, side view, perspective view, and a front view of an assembled apparatus 100 according to some embodiments. FIGS. 10A, 10C, and 10D depict the spacing of the cables 116 across the coir fiber rolls 110 according to some embodiments. FIGS. 10A, 10C, and 10D also depict the spacing of the posts 160 across the closest coir fiber roll 110 according to some embodiments.

Figure 11A:
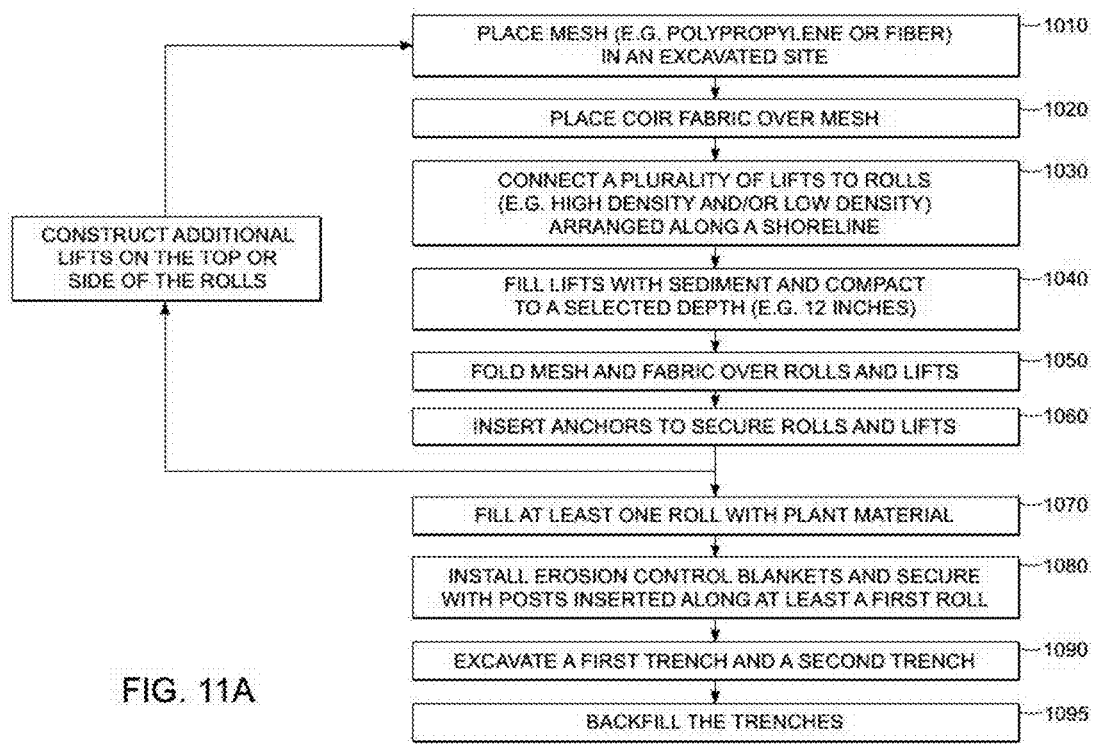
FIG. 11A depicts a method of installing an erosion control apparatus, according to some embodiments.

FIG. 11A depicts a method of installing an erosion control apparatus, according to some embodiments. The method begins when a layer of mesh is placed within an excavated site (Step 1010). The soil behind the site, relative to the shoreline, riverbank, lakefront, or other waterfront, may be graded. The mesh may comprise raschel polypropylene knotless netting (or comparable equivalent), 3 mm high tenacity (rip resistant), 1½" mesh opening, with UV stabilization, or may comprise polyethylene or coir fiber. The netting can be biodegradable or in a preferred embodiment is non-photodegradable. In some embodiments, the mesh opening can range from ½" to 7". Next, at least one layer of coir fabric is placed over the mesh (Step 1020). In some embodiments, two layers of seven hundred gram (or heavier) coir fabric is layered over the mesh. In some embodiments, one or two layers of 700-gram woven coir fabric encased by high tenacity (rip resistant) polypropylene synthetic mesh comprise a soil lift.

Coir fiber rolls are then arranged in the site relative to the shoreline and connected within the soil lifts (Step 1030). A coir fiber roll may be a 20" diameter by 10' long, measured at a nine pound per cubic foot density, comprised of a mattress of inner coir fibers encased in a UV stabilized synthetic polypropylene mesh. Alternatively, the coir fiber roll may be a mattress of inner coir fibers encased in a 100% biodegradable coir rope mesh. The soil lifts are filled with sediment and the sediment is compacted (Step 1040). All sediment in each soil lift has a consistent depth of approximately 12". The sediment in each soil lift is compacted using a portable plate compactor at 6" soil depth intervals. Thus, the fill material positioned between the fiber rolls and the anchors can include soil, rocks, or other biodegradable materials either within, or instead of, soil lifts. Optionally, all of the fill material can be contained within a single container that envelopes the volume between the fiber rolls and the anchor system.

Then the mesh and the coir fabric are folded over the coir fiber rolls and soil lifts (Step (1050). In an embodiment, the number of coir fiber rolls in the apparatus and the number of coir fiber rolls covered by the mesh are determined by specific design criteria varying with each installation site. In an embodiment, the mesh is installed as each lift is constructed. The completed series of coir fiber rolls and soil lifts may be referred to as a protection array.

The method continues when a plurality of anchors are inserted and coupled to the rolls to secure the rolls to the soil lifts. (Step 1060). Step 1060 is described in further detail below in regards to FIG. 11B. Steps 1010 through 1060 may be repeated as necessary to construct additional soil lifts. The additional soil lifts may be constructed on the top or the side of the rolls.

After construction of the soil lifts is completed, at least one coir fiber roll is filled with plant material (Step 1070). The plant material may be any vegetation with suitable roots for securing the apparatus from eroding. In an embodiment, the plant life is American beachgrass. In other embodiments, the plant material may be any native plantings appropriate to the site conditions, which will grow quickly and stabilize the landform. Next at least one biodegradable erosion control blanket is installed and secured with posts inserted along at least a first fiber roll (Step 1080). The blanket may be installed along all disturbed and/or unstable ground located above the protection array. In an embodiment, the blanket is biodegradable. In a further embodiment, the blanket comprises coir fiber netting. If multiple blankets are employed, an interior blanket is typically a straw/coir/jute, short term, composite erosion control blanket and an exterior blanket is typically 700 or 900 gram woven coir fabric. The at least one blanket is secured when a plurality of posts are inserted through the blanket along at least a first roll of the apparatus relative to the shoreline, riverbank, lakefront, or other waterfront. The plurality of posts may be 4" by 4" or 6" by 6", and spaced at 5 foot intervals along the first coir fiber roll. The blanket may additionally be secured by a biodegradable twine used to secure the blanket firmly to the soil. The twine may extend from the highest elevation of destabilized or disturbed soil down the uppermost soil lift.

A first trench is excavated at a highest end of the apparatus and a second trench is excavated at a lowest end of the apparatus. (Step 1090). In some embodiments, only a first trench is excavated. In an embodiment, the trenches are 6"×6" (that is at least six inches wide and six inches deep) lock-in trenches at the top and bottom of the slope with a minimum of 6" overlaps. 30" hardwood stakes may be used at a density of 36" on center with ¼" biodegradable twine used to secure the mesh to the ground surface. The trenches are be backfilled, seeded, and lightly mulched with sterilized, weed-free chopped straw or comparable equivalent mulch product. (Step 1095).

Figure 11B:
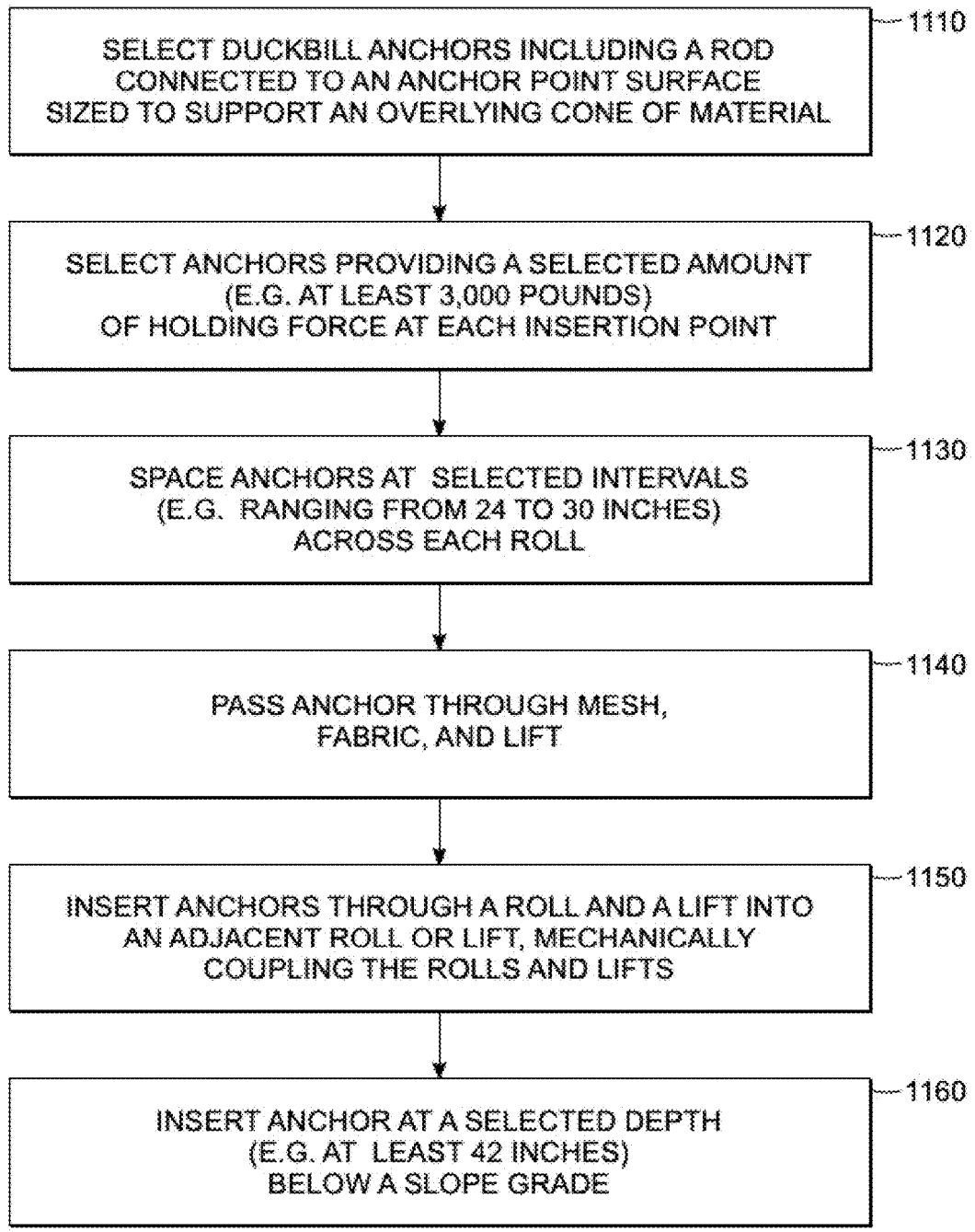
FIG. 11B depicts a method of inserting anchors to secure fiber rolls and soil lifts according to some embodiments.

FIG. 11B depicts a method of inserting anchors to secure fiber rolls and soil lifts according to some embodiments. The method begins when duckbill anchors including a rod connected to an anchor point surface sized to support an overlying cone of material are selected (Step 1110). Anchors providing at least 3,000 pounds of holding force at each insertion point (Step 1120). After the anchors are selected, the anchors are spaced approximately every twenty-four to thirty inches along the top and bottom edge of each coir fiber roll (Step 1130). In one embodiment, at least twenty to twenty-nine anchors are inserted per one hundred square feet.

The anchors are passed through the mesh, coir fabric, and soil lift (Step 1040). In a preferred embodiment, the anchors pass through the mesh and soil lifts, which operates to distribute the anchoring force across the entire embedded structure. The coir fiber rolls are anchored with the use of earth anchors and the earth anchors can be inserted through the rolls. Next, the anchors are inserted adjacent to a coir fiber roll and through a soil lift adjacent to another coir fiber roll or through an adjacent soil lift, mechanically coupling the coir fiber rolls and soil lifts (Step 1150). The anchors pass through the mesh and soil lifts to distribute the anchoring force across the system.

In an embodiment, the anchors are inserted at a fixed depth into soil underneath the apparatus; the depth being at least forty-two inches (Step 1060). In the above methods, the anchors may be earth anchors. The earth anchors may be helical-style anchors, duckbill-style anchors, or any other type of anchor that can be driven below grade.

In one embodiment, after a soil lift is compacted, a roll is placed along the "water" side of the lift and the blanket and mesh are folded back toward the landform. In one embodiment, the anchors are driven into the soil after each grouping of the lift, roll, blanket, and mesh are constructed. In another embodiment the anchors may be driven into the soil after each individual lift is constructed, after 2-3 lifts have been constructed or after all the lifts are constructed. In an embodiment utilizing duckbill anchors, anchors should be installed after a lift is constructed. In an embodiment utilizing helical anchors, the anchors may be installed prior to construction of the lifts and steel cables would need to be pulled up through the lifts.

Figure 12A:
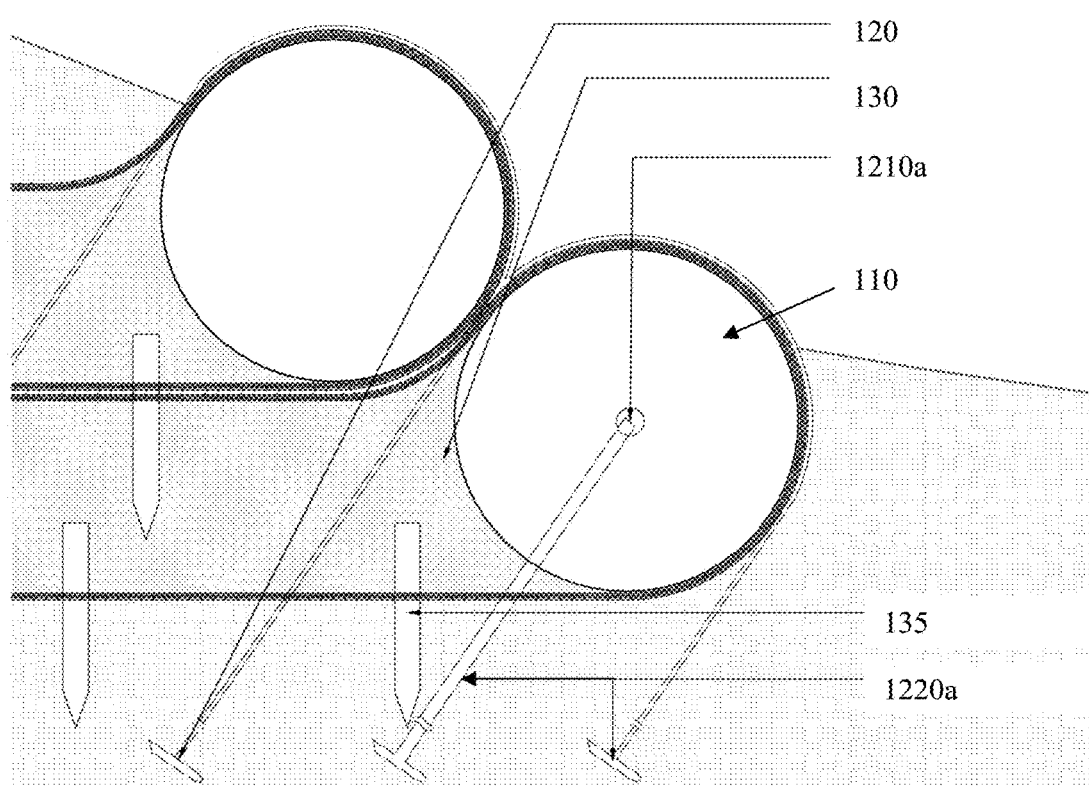
FIG. 12A is a side view of an inserted anchor according to some embodiments.
Figure 12B:
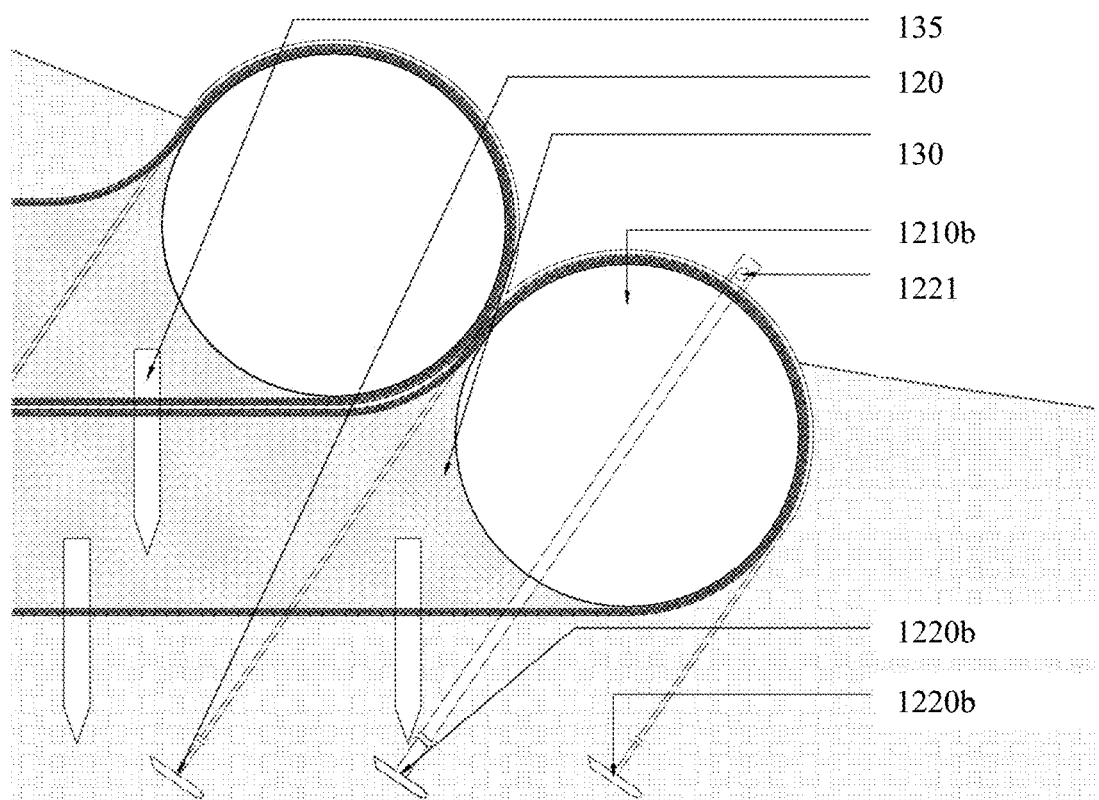
FIG. 12B is a side view of an inserted anchor according to some embodiments.

FIGS. 12A and 12B are side views of an inserted anchor according to some embodiments. An anchor 1220a or 1220b can be coupled to a longitudinally extending element, such as a rod, cable, or roll insert that can be centered within the roll or, alternatively, against the outer wall of the roll or positioned with an internal frame positioned within the wall, into an apparatus 100 by extending a cable of the anchor 1220a or 1220b through a coir fiber roll 1210a or 1210b. In some embodiments, the coir fiber roll 1210a may be constructed to include an anchor 1220a within the coir fiber roll 1210a. After the coir fiber roll 1210a is arranged within an excavated site, the anchor 1220a is extended from within the coir fiber roll 1210a to a desired depth.

In some embodiments, the anchor 1220b can be secured to the coir fiber roll 1220b with a clamp 1221. The clamp 1221 is attached to a surface of the coir fiber roll 1210b. In some embodiments, the clamp 1221 is attached to the surface of the coir fiber roll 1210b adjacent to the slope surface of the apparatus 100. A plurality of clamps 1221 are secured to the surfaces of the plurality of coir fiber rolls 1210b, each clamp 1221 securing a cable of an anchor 1220b to the plurality of coir fiber rolls 1210b. In some embodiments, each coir fiber roll 1210b is attached to one clamp 1221. In other embodiments, multiple clamps 1221 and anchors 1220b are attached to one or more coir fiber rolls 1210b.

Figure 13:
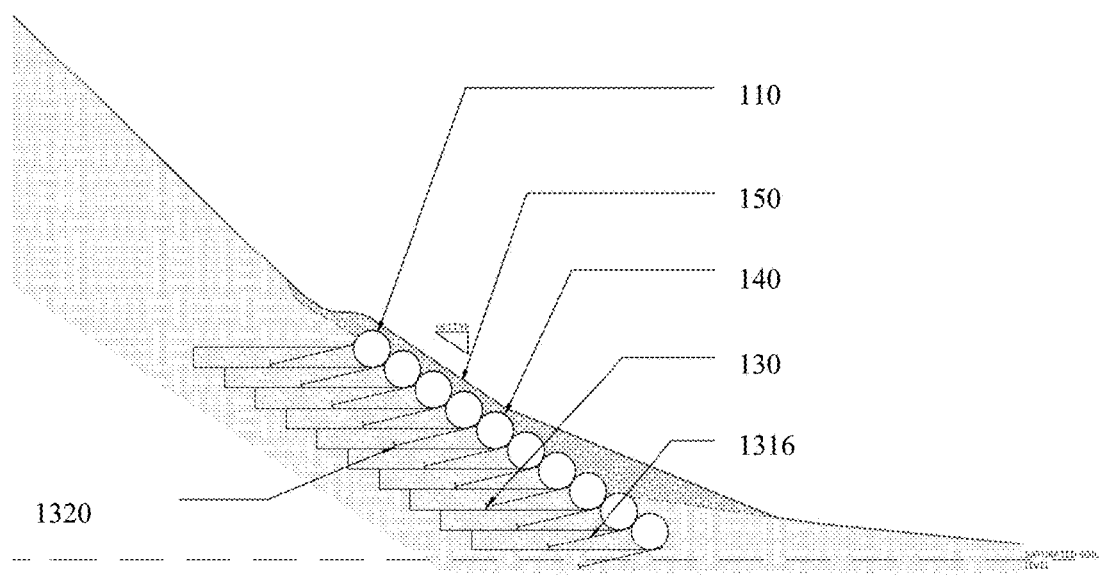
FIG. 13 is a side view of an anchoring system inserted relative to soil saturation according to some embodiments.

FIG. 13 is a side view of an anchoring system configured relative to soil saturation according to some embodiments. In some embodiments, the angle at which anchors 1320 are inserted into the soil are determined relative to the saturation level of the soil surrounding the anchor point surface of the anchor 1320. The saturation level refers to the amount of water retained by the soil, either at the time of installation or during a weather event such as flooding, a storm, a hurricane, and the like. Each anchor 1320 may be inserted at varying angles throughout the apparatus 100 relative to the saturation level of soil at each anchor point.

The anchor 1320 may be inserted with the cable 1316 oriented at an angular range $\theta_1$ relative to the slope angle of the soil at the insertion point of the anchor 1320a or, if different, the slope angle $\theta_2$ of the coir fiber rolls 110. In some embodiments, an anchor 1320 may be inserted as described previously herein in a direction orthogonal to the soil grade or coir fiber rolls 110 if the soil surrounding the anchor point surface is unsaturated or will remain unsaturated during a weather event. In some embodiments, an anchor 1320 may be inserted at an angle up to 45 degrees relative to the orthogonal direction (normal) to the plane if the soil surrounding the anchor point surface is fully saturated or will be fully saturated during a weather event. In some embodiments, an anchor 1320 may be inserted up to 10 degrees relative to the orthogonal direction or plane. In some embodiments, an anchor 1320 may be inserted up to 20 degrees relative to the orthogonal direction. In some embodiments, an anchor 1320 may be inserted up to 30 degrees relative to the orthogonal direction. In some embodiments, an anchor 1320 may be inserted up to 40 degrees relative to the orthogonal direction.

Figure 14A:
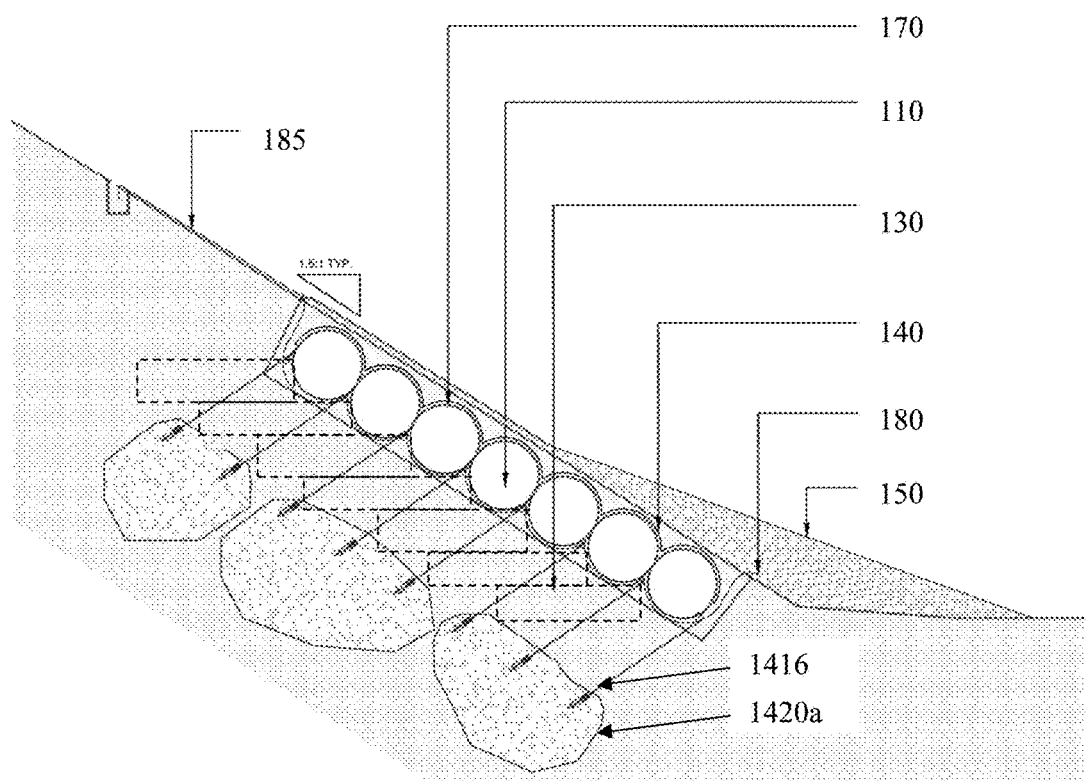
FIG. 14A is a side view of an anchoring system including reinforcement elements according to some embodiments.

FIG. 14A is a side view of an anchoring system including reinforcement elements according to some embodiments. In some embodiments, the anchors may be coupled to reinforcement elements 1420a. The reinforcement elements 1420a can include one or more rocks, stones, or boulders, concrete formations or other formed materials, or a combination thereof. In some embodiments, the reinforcement elements 1420*a* are coupled to friction anchors. In further embodiments, an end of the friction anchors are embedded within the reinforcement elements 1420*a*. In some embodiments, the anchors are duckbill anchors, helical anchors, or other earth anchors. The anchors comprise cables 1416*a* extending from the reinforcement elements 1420*a* to the coir fiber rolls 110. In some embodiments, the reinforcement elements 1420*a* include the cables 1416*a* that extend to the coir fiber rolls 110.

The reinforcement elements 1420*a* can be inserted at a depth of at least 42 inches below the slope surface of the apparatus. In some embodiments, the reinforcement elements 1420*a* may be native to the soil and the apparatus can be constructed over the native reinforcement elements 1420*a*. In some embodiments, the reinforcement elements 1420*a* may be coupled to anchors prior to inserting the reinforcement elements 1420*a* into the soil. The anchors are extended from the reinforcement elements 1420*a* after insertion of other elements of the apparatus such as the mesh 140, blanket 180, soil lifts 130, and coir fiber rolls 110. In some embodiments, the anchors are inserted through mesh 140 and at least one soil lift 130 then coupled to the reinforcement elements 1420*a*.

Figure 14B:
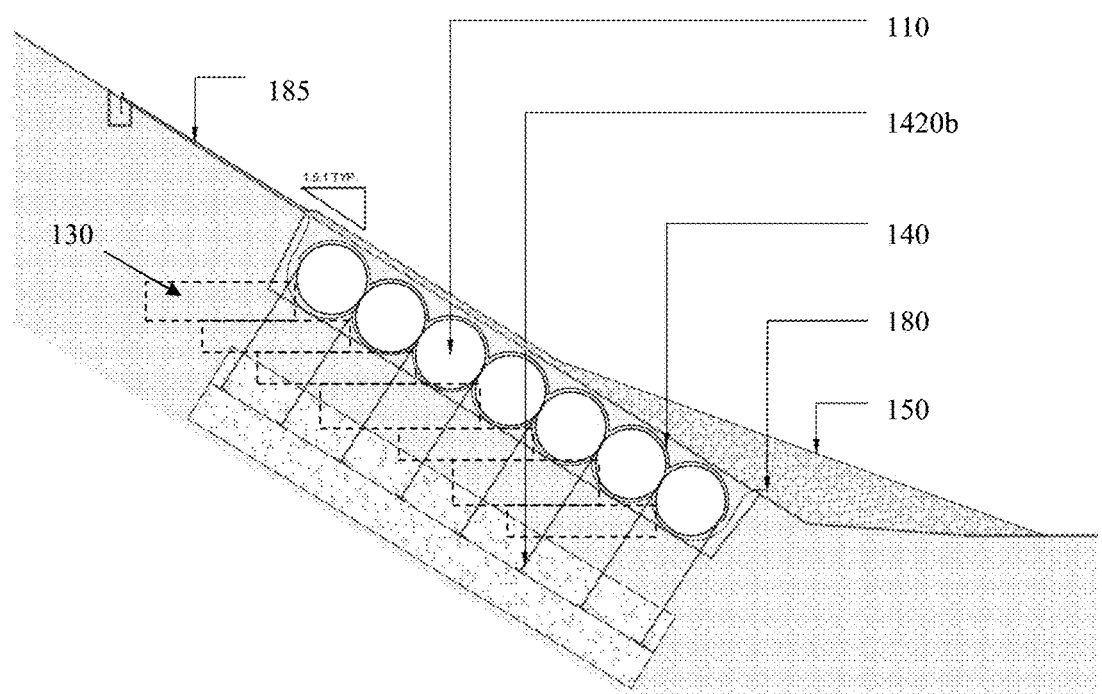
FIG. 14B is a side view of an anchoring system including concrete according to some embodiments.

FIG. 14B is a side view of an anchoring system including concrete according to some embodiments. In some embodiments, the reinforcement element 1420*b* is concrete. The concrete 1420*b* is poured into place over anchors previously inserted into soil, embedding the anchor point surfaces in the concrete 1420*b*. In some embodiments, the concrete 1420*b* is poured into place prior to installation of the soil lifts 130. In some embodiments, the concrete 1420*b* is poured at a depth of at least 42 inches below the slope surface of the apparatus. Such formed blocks, cylinders, or other desired shapes can be attached to fiber rolls by cables, rods, or other coupling fixtures. These can be attached by threaded fixtures or formed loops to the formed components.

Figure 15A:
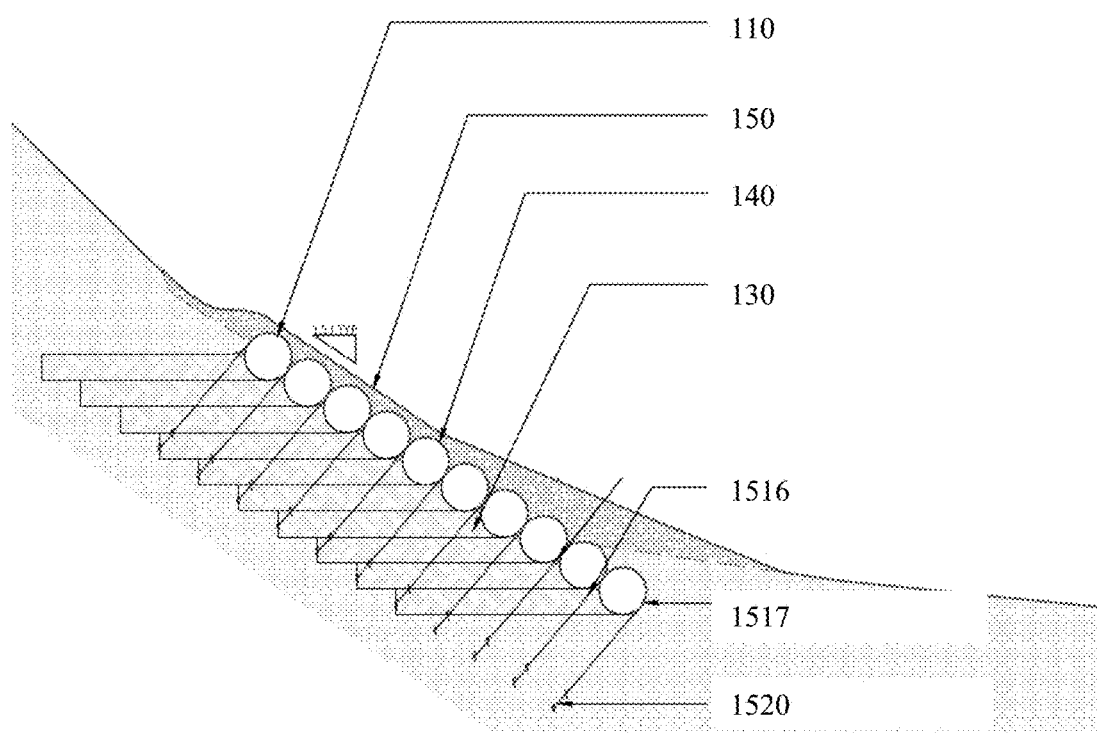
FIGS. 15A and 15B are side views of an anchoring system including helical anchors according to some embodiments.
Figure 15B:
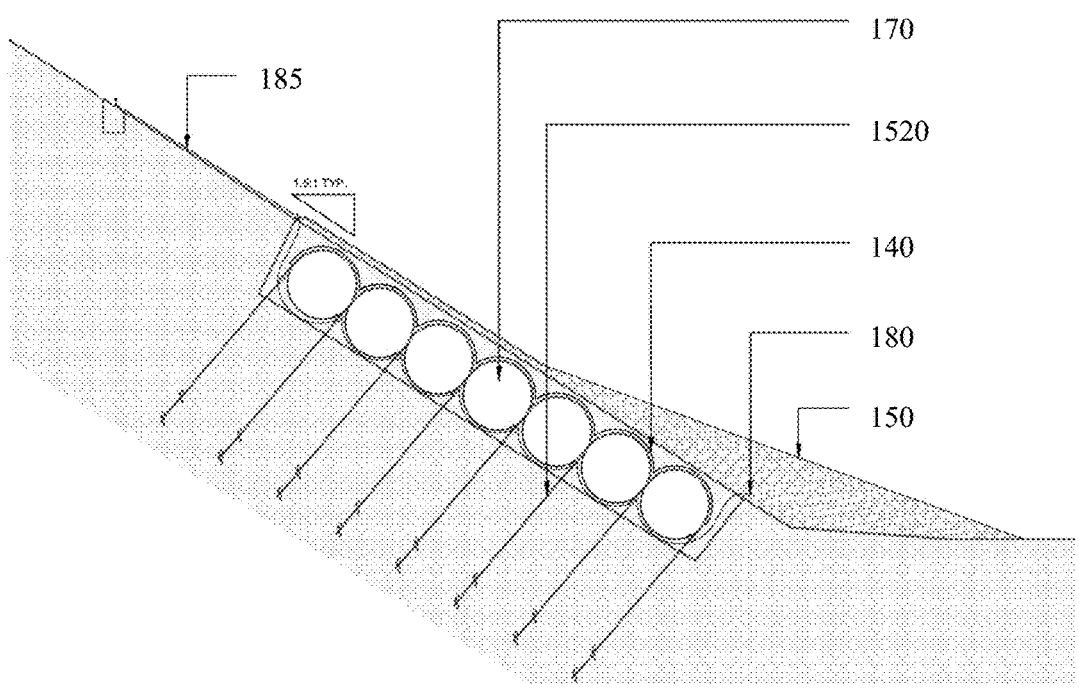

FIGS. 15A and 15B are side views of an anchoring system including helical anchors according to some embodiments. Each helical anchor 1520 includes a cable 1516. The cables 1516 are coupled to fiber rolls 110 with crimps 1517. The crimps 1517 tighten and fasten the cables 1516. In some embodiments, the crimps 1517 are zinc plated copper crimps. A method of installing an erosion control apparatus including helical anchors 1520 is described below.

According to some embodiments, installation of an erosion control apparatus begins with preparation of the soil at an excavation site. The soil is compacted and graded at a specified slope angle. In some embodiments, the soil is graded at a slope angle in a range of 0 to 45 degrees (1:1 slope). In an embodiment, the soil is graded at a slope angle in a range of 20 to 50 degrees. In a further embodiment, the soil is graded at a slope angle no greater than 33 degrees (2:1 slope). The slope angle may be 33, 34, 35, 36, 37, 38, 39, 40, 41, 42, 43, 44, 45, 46, 47, 48, 49, or 50 degrees, or any angle in between. In some embodiments, the soil of the apparatus can include varying slope angles throughout the apparatus.

Next a plurality of anchors are selected. The anchors may be helical anchors including a cable connected to an anchor point surface sized to support an overlying cone of material. The anchors provide at least 3,000 pounds of holding force at each insertion point. After the anchors are selected, the anchors are spaced approximately every twenty-four to thirty inches. In one embodiment, at least twenty to twenty-nine anchors are inserted per one hundred square feet.

Then, a layer of mesh is placed within an excavated site. The mesh may comprise raschel polypropylene knotless netting (or comparable equivalent), 3 mm high tenacity (rip resistant), 1½" mesh opening, with UV stabilization, or may comprise polyethylene or coir fiber. The netting can be biodegradable or in a preferred embodiment is non-photodegradable. In some embodiments, the mesh opening can range from ½" to 7". Next, at least one layer of coir fabric is placed over the mesh. In some embodiments, two layers of seven hundred gram (or heavier) coir fabric is layered over the mesh. In some embodiments, one or two layers of 700-gram woven coir fabric encased by high tenacity (rip resistant) polypropylene synthetic mesh comprise a soil lift.

Coir fiber rolls are then arranged in the site relative to the shoreline and connected within the soil lifts. A coir fiber roll may be a 20" diameter by 10' long, measured at a nine pound per cubic foot density, comprised of a mattress of inner coir fibers encased in a UV stabilized synthetic polypropylene mesh. Alternatively, the coir fiber roll may be a mattress of inner coir fibers encased in a 100% biodegradable coir rope mesh.

Next the anchor cables are passed through the mesh, the layer of coir fabric, the plurality of coir fiber rolls, and the soil lifts. Passing the anchors through the mesh, coir fabric, fiber rolls, and soil lifts of the apparatus overlaps the frustum cone of each anchor with the mesh, coir fabric, fiber rolls, and soil lifts, sharing the loads of each anchor with the mesh, coir fabric, fiber rolls, and soil lifts of the apparatus. Such an overlap provides for stronger reinforcement of the area within the frustum cone of each anchor.

Then the mesh and the coir fabric are folded over the coir fiber rolls and soil lifts. In an embodiment, the number of coir fiber rolls in the apparatus and the number of coir fiber rolls covered by the mesh are determined by specific design criteria varying with each installation site. In an embodiment, the mesh is installed as each lift is constructed. The completed series of coir fiber rolls and soil lifts may be referred to as a protection array.

The cables are then tightened and fastened to the coir fiber rolls. In some embodiments, each cable is tightened and fastened with a crimp. In further embodiments, the crimps are zinc plated copper crimps. The crimps may be attached an end of the cable opposite the end of the anchor comprising the anchor surface area.

In some embodiments, after the cables are fastened at least one coir fiber roll is filled with plant material as described above. Next at least one biodegradable erosion control blanket is installed and secured with posts inserted along at least a first fiber roll as described above. A first trench is excavated at a highest end of the apparatus and a second trench is excavated at a lowest end of the apparatus as described above. The trenches are backfilled, seeded, and lightly mulched with sterilized, weed-free chopped straw or comparable equivalent mulch product.

Figure 16A:
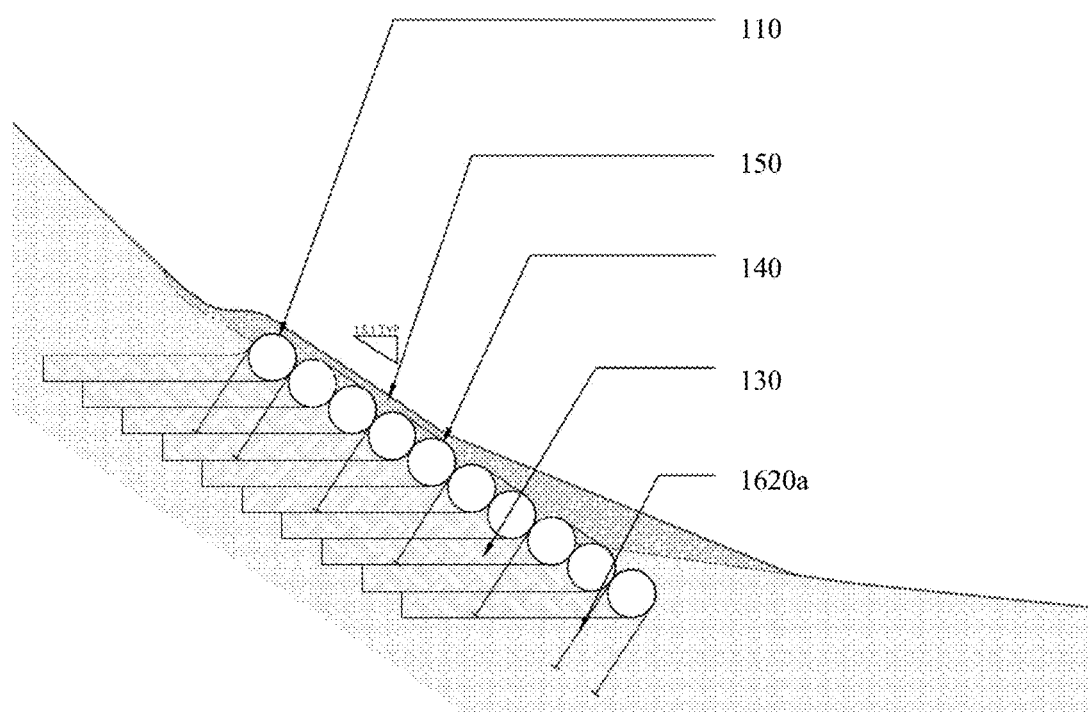
FIG. 16A is a side view of a shared anchor cable system according to some embodiments.

FIG. 16A is a side view of an anchor cable system according to some embodiments. In some embodiments, anchors 1620*a* are shared across multiple coir fiber rolls 110. Multiple anchors 1620*a* may share a cable. Each cable is extended over at least one coir fiber roll 110. For example, two anchors 1620*a* may share one cable that extends over two coir fiber rolls 110. Each of the anchors 1620*a* may be inserted between two coir fiber rolls 110 or along the outer surface of the first or last coir fiber roll 110 in an array of coir fiber rolls 110. The cable shared between each anchor 1620*a* is laid over the coir fiber rolls 110. In one exemplary embodiment depicted in FIG. 16A, a portion of anchors 1620*a* share a cable that extends over two inner coir fiber rolls 110 and a portion of anchors 1620*a* extends over on outer coir fiber roll 1620*a*.

Figure 16B:
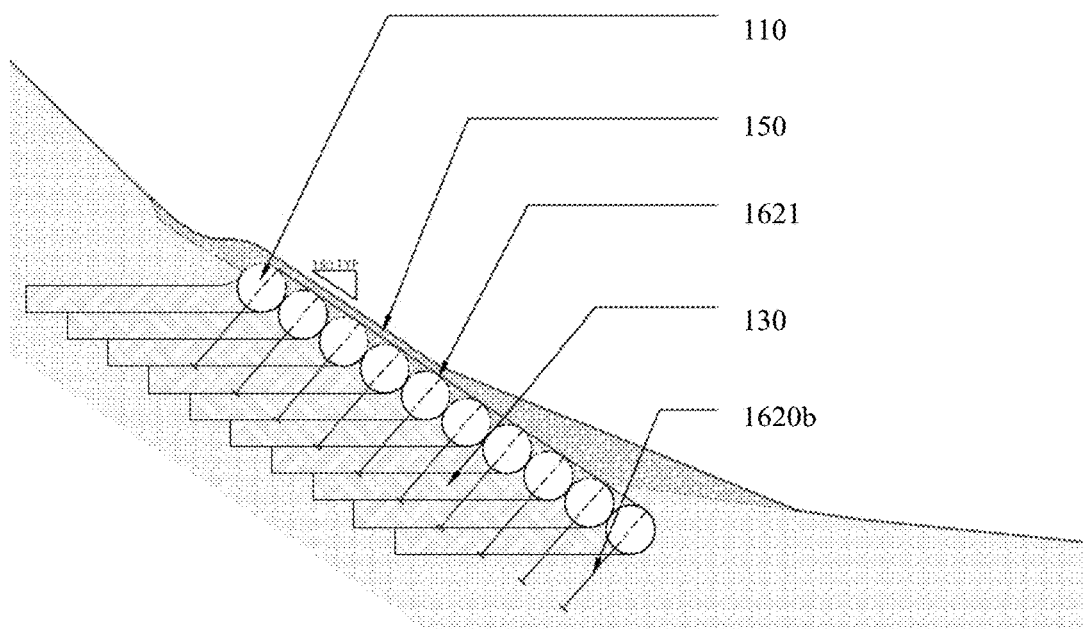
FIG. 16B is a side view of a shared anchor cable system including a connecting cable according to some embodiments.

FIG. 16B is a side view of an anchor cable system according to some embodiments. In some embodiments, each anchor 1620b is connected to a connecting cable 1621. The connecting cable 1621 extends over the plurality of fiber rolls 110. In some embodiments, the connecting cable 1621 extends over the surface of the coir fiber rolls 110 adjacent to the slope surface of the apparatus 100.

Other embodiments will be apparent to those skilled in the art from consideration of the specification and practice of this disclosure. It is intended that the specification and examples be considered as exemplary only, with the true scope and spirit of the disclosed devices and methods being indicated by the following claims.

What is claimed is:

1. An erosion control apparatus comprising:
    a plurality of fiber rolls, wherein the fiber rolls are arranged at a slope angle relative to a shoreline;
    a plurality of anchors, each anchor comprising an anchor point and an anchor surface having a surface area, each anchor point coupled to one or more cables of a plurality of cables, wherein at least one cable extends from one of the plurality of fiber rolls to couple with said anchor, each anchor inserted at a depth relative to the apparatus;
    a plurality of soil lifts defining a layered soil lift array, each soil lift connected to at least one fiber roll, and wherein each soil lift comprises a fibrous layer encasing a fill material, at least a portion of the plurality of fiber rolls and the plurality of soil lifts being positioned over at least a portion of the plurality of the anchor points wherein the plurality of the cables are coupled to the anchors through at least a portion of the layered soil lift array such that at least one anchor applies a minimum holding force of 3,000 pounds to the soil lift array; and
    a mesh covering at least one fiber roll and at least one of the plurality of soil lifts.

2. The apparatus of claim 1, wherein each cable extends from inside a fiber roll.

3. The apparatus of claim 1, further comprising a plurality of clamps contacting a surface of the plurality of fiber rolls, each clamp securing a cable to a fiber roll.

4. The apparatus of claim 1, wherein each anchor surface area is sized to support an overlying cone of fill material and each cable extends in an orthogonal direction to a plane extending through a plurality of fiber rolls, or extends at an angle within 30 degrees of the orthogonal direction.

5. The apparatus of claim 4, wherein the anchors are spaced at intervals across each fiber roll, each interval having a length in a range of 24 inches to 96 inches.

6. The apparatus of claim 1, wherein the anchors are inserted at a depth of at least 42 inches below a slope surface of the apparatus.

7. The apparatus of claim 1, wherein each anchor point provides at least 3,000 pounds of holding force through the cable.

8. The apparatus of claim 1, further comprising a first trench that is at least 6 inches wide and at least 6 inches deep.

9. The apparatus of claim 8, wherein the first trench is covered with sand or soil.

10. The apparatus of claim 1, further comprising plant material positioned on or within at least one fiber roll.

11. The apparatus of claim 1, further comprising a second mesh that covers at least one of the fiber rolls.

12. The apparatus of claim 1, further comprising at least one erosion control blanket, wherein the blanket comprises a biodegradable material.

13. The apparatus of claim 1, further comprising a plurality of posts placed along at least a first fiber roll of the apparatus relative to the shoreline.

14. The apparatus of claim 1, wherein the fill material is compressed within each soil lift.

15. The apparatus of claim 14, wherein the fibrous layer comprises at least one layer of coir fabric that retains sediment.

16. The apparatus of claim 1, wherein the anchor points further comprise a plurality of coupling elements to a rock or a formed material.

17. The apparatus of claim 1, wherein each anchor point includes a duckbill anchor or a helical anchor coupled to a cable with a rod.

18. A method of installing an erosion control apparatus comprising:
    arranging a first fiber roll, connecting a first soil lift to the first fiber roll, and inserting a first plurality of anchors coupled to the first fiber roll with a first plurality of cables extending through the first soil lift, wherein the first fiber roll, the first soil lift, and the first plurality of anchors comprise a first layer;
    arranging a second fiber roll, connecting a second soil lift to the second fiber roll, and inserting a second plurality of anchors coupled to at least the second fiber roll with a second plurality of cables and extending through the second soil lift, wherein the second fiber roll, the second soil lift, and the second plurality of anchors comprise a second layer;
    arranging a third fiber roll, connecting a third soil lift to the third fiber roll, and inserting a third plurality of anchors coupled to at least the third fiber roll with a third plurality of cables extending through the third soil lift, wherein the third fiber roll, the third soil lift, and the third plurality of anchors comprise a third layer;
    wherein each anchor comprises an anchor point and an anchor point surface having a surface area, and wherein each soil lift comprises a fibrous layer encasing a fill material; and
    wherein the anchor points are coupled to the fiber rolls with one or more of the cables and further wherein the anchor points are positioned at a depth such that at least a portion of the plurality of fiber rolls and the plurality of soil lifts are positioned over at least a portion of the plurality of the anchor points, wherein each cable is coupled to at least one anchor through at least one soil lift such that a minimum holding force of 3000 pounds holds at least one of the fiber rolls to at least of one of the anchors, and each fiber roll is covered by a mesh.

19. The method of claim 18, further comprising securing a plurality of clamps to a portion of each of the plurality of cables, each clamp securing at least one cable to one or more fiber rolls.

20. The method of claim 18, further comprising inserting the plurality of anchors, each having one of the anchor points, wherein at least a portion of the anchors comprise a duckbill anchor, the anchors being spaced at intervals across each fiber roll, each anchor point surface sized to support an overlying cone of material, each cable extending in an orthogonal direction to a plane extending through a plurality of fiber rolls, or extends at an angle within 30 degrees of the orthogonal direction.

21. The method of claim 20, wherein each interval can have a length in a range of 24 inches to 96 inches.

22. The method of claim 18, further comprising inserting the anchors at a depth of at least 42 inches below a slope surface of the apparatus, wherein the anchors comprise a plurality of helical anchors, or a plurality of duckbill anchors or a combination thereof.

23. The method of claim 18, wherein each anchor point provides at least 3,000 pounds of holding force.

24. The method of claim 18, further comprising:
   positioning anchors comprising rocks or one or more concrete elements, each rock or concrete element having an anchor point attached thereto;
   positioning a fill material over the anchors;
   positioning the fiber rolls over the fill material and the anchors; and
   coupling the rolls to the anchor points with the cables wherein the cables include one or more metal cables.

25. The method of claim 18, wherein each fiber roll and each soil lift is covered by a corresponding mesh.

26. The method of claim 18, further comprising arranging a fourth fiber roll, connecting a fourth soil lift to the fourth fiber roll, and inserting a fourth plurality of anchors coupled to at least the fourth fiber roll with a fourth plurality of cables that extend through the fourth soil lift, wherein the fourth fiber roll, the fourth soil lift, and the fourth plurality of anchors comprise a fourth layer.

27. The method of claim 18, further comprising compacting fill material within each soil lift before positioning a further layer over the compacted fill material.

28. The method of claim 18, wherein one or more anchors are driven through a compacted soil lift into an underlying soil lift or sediment.

\* \* \* \* \*